(12) United States Patent
Zhou et al.

(10) Patent No.: US 10,982,090 B2
(45) Date of Patent: Apr. 20, 2021

(54) GRAPHIC ARTICLES COMPRISING POLYLACTIC ACID POLYMER BASED FILM

(71) Applicant: 3M INNOVATIVE PROPERTIES COMPANY, St. Paul, MN (US)

(72) Inventors: Ning Zhou, Vadnais Heights, MN (US); John A. Nielsen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/301,081

(22) PCT Filed: Jun. 9, 2017

(86) PCT No.: PCT/US2017/036686
§ 371 (c)(1),
(2) Date: Nov. 13, 2018

(87) PCT Pub. No.: WO2017/222824
PCT Pub. Date: Dec. 28, 2017

(65) Prior Publication Data
US 2019/0185662 A1    Jun. 20, 2019

Related U.S. Application Data

(60) Provisional application No. 62/352,639, filed on Jun. 21, 2016.

(51) Int. Cl.
*C08L 67/04* (2006.01)
*C08J 5/18* (2006.01)
(Continued)

(52) U.S. Cl.
CPC ............... *C08L 67/04* (2013.01); *B32B 5/18* (2013.01); *B32B 5/32* (2013.01); *B32B 7/06* (2013.01);
(Continued)

(58) Field of Classification Search
None
See application file for complete search history.

(56) References Cited

U.S. PATENT DOCUMENTS 3,011,988 A   12/1961   Luedke
4,950,258 A   8/1990    Kawai
(Continued)

FOREIGN PATENT DOCUMENTS

CN   101104779   1/2008
CN   101397394   4/2009
(Continued)

OTHER PUBLICATIONS 3M (TM) Screen printing ink 1905 Black, 2016, pp. 03.
(Continued)

*Primary Examiner* — Ronak C Patel
(74) *Attorney, Agent, or Firm* — Carolyn A. Fischer

(57) ABSTRACT

A graphic article comprising a Poly lactic acid (PLA) based film and in particular, an ink layer depicting a graphic is described. The PLA based film comprises a semicrystalline polylactic acid polymer, a second of a polyvinyl acetate polymer having a glass transition temperature (Tg) of at least 25° C., and plasticizer. The article is typically a tape or sheet that may further comprise an adhesive (e.g. pressure sensitive) and a low adhesion backsize or a release liner. A method of forming a graphic article using the film of the invention is also disclosed.

25 Claims, 6 Drawing Sheets

(51) Int. Cl.
| | |
|---|---|
| C09J 7/25 | (2018.01) |
| B32B 27/32 | (2006.01) |
| B32B 15/04 | (2006.01) |
| B32B 27/30 | (2006.01) |
| B32B 27/06 | (2006.01) |
| B32B 7/06 | (2019.01) |
| B32B 29/00 | (2006.01) |
| B32B 27/36 | (2006.01) |
| B32B 27/08 | (2006.01) |
| B32B 7/12 | (2006.01) |
| B32B 15/12 | (2006.01) |
| B32B 27/20 | (2006.01) |
| B41M 1/30 | (2006.01) |
| B32B 5/18 | (2006.01) |
| B32B 27/40 | (2006.01) |
| B32B 27/28 | (2006.01) |
| B32B 23/08 | (2006.01) |
| B32B 27/22 | (2006.01) |
| B32B 27/10 | (2006.01) |
| C08L 31/04 | (2006.01) |
| B32B 15/08 | (2006.01) |
| B32B 15/09 | (2006.01) |
| B32B 5/32 | (2006.01) |
| B32B 27/00 | (2006.01) |
| B32B 27/16 | (2006.01) |
| B32B 27/34 | (2006.01) |
| B41M 5/00 | (2006.01) |

(52) U.S. Cl.
CPC .............. *B32B 7/12* (2013.01); *B32B 15/043* (2013.01); *B32B 15/046* (2013.01); *B32B 15/08* (2013.01); *B32B 15/09* (2013.01); *B32B 15/12* (2013.01); *B32B 23/08* (2013.01); *B32B 27/00* (2013.01); *B32B 27/065* (2013.01); *B32B 27/08* (2013.01); *B32B 27/10* (2013.01); *B32B 27/16* (2013.01); *B32B 27/20* (2013.01); *B32B 27/22* (2013.01); *B32B 27/28* (2013.01); *B32B 27/281* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 29/005* (2013.01); *B32B 29/007* (2013.01); *B41M 1/30* (2013.01); *C08J 5/18* (2013.01); *C08L 31/04* (2013.01); *C09J 7/255* (2018.01); *B32B 2255/06* (2013.01); *B32B 2255/10* (2013.01); *B32B 2255/102* (2013.01); *B32B 2255/12* (2013.01); *B32B 2255/205* (2013.01); *B32B 2264/02* (2013.01); *B32B 2264/101* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2270/00* (2013.01); *B32B 2307/30* (2013.01); *B32B 2307/4026* (2013.01); *B32B 2307/41* (2013.01); *B32B 2307/412* (2013.01); *B32B 2307/416* (2013.01); *B32B 2307/50* (2013.01); *B32B 2307/54* (2013.01); *B32B 2307/718* (2013.01); *B32B 2307/732* (2013.01); *B32B 2307/748* (2013.01); *B32B 2405/00* (2013.01); *B32B 2419/00* (2013.01); *B32B 2605/00* (2013.01); *B41M 5/0047* (2013.01); *B41M 5/0064* (2013.01); *C08J 2367/04* (2013.01); *C08L 2205/02* (2013.01); *C08L 2205/03* (2013.01); *C09J 2431/006* (2013.01); *C09J 2467/006* (2013.01)

(56) References Cited

U.S. PATENT DOCUMENTS

| | | |
|---|---|---|
| 5,032,460 A | 7/1991 | Kantner |
| 5,216,050 A | 6/1993 | Sinclair |
| 5,296,277 A | 3/1994 | Wilson |
| 5,443,780 A | 8/1995 | Matsumoto |
| 5,502,158 A | 3/1996 | Sinclair |
| 5,536,807 A | 7/1996 | Gruber |
| 5,623,010 A | 4/1997 | Groves |
| 5,663,288 A | 9/1997 | Shinoda |
| 5,677,376 A | 10/1997 | Groves |
| 5,686,504 A | 11/1997 | Ang |
| 5,698,279 A | 12/1997 | Vicik |
| 5,726,220 A | 3/1998 | Tokushige |
| 5,798,436 A | 8/1998 | Gruber |
| 5,814,685 A | 9/1998 | Satake |
| 5,883,199 A | 3/1999 | McCarthy |
| 6,005,068 A | 12/1999 | Gruber |
| 6,113,679 A | 9/2000 | Adkins |
| 6,114,495 A | 9/2000 | Kolstad |
| 6,121,410 A | 9/2000 | Gruber |
| 6,136,905 A | 10/2000 | Suzuki |
| 6,143,863 A | 11/2000 | Gruber |
| 6,160,084 A | 12/2000 | Langer |
| 6,232,359 B1 | 5/2001 | Christian |
| 6,294,249 B1 | 9/2001 | Hamer |
| 6,323,308 B1 | 11/2001 | Kobayashi |
| 6,498,202 B1 | 12/2002 | Sun |
| 6,534,172 B1 | 3/2003 | Kawashima |
| 6,600,008 B1 | 7/2003 | Kobayashi |
| 6,649,732 B2 | 11/2003 | Kobayashi |
| 6,846,075 B2 | 1/2005 | Ylitalo |
| 6,869,985 B2 | 3/2005 | Mohanty |
| 6,881,458 B2 | 4/2005 | Ludwig |
| 6,949,212 B2 | 9/2005 | Merrill |
| 7,025,453 B2 | 4/2006 | Ylitalo |
| 7,371,799 B2 | 5/2008 | Mather |
| 7,385,020 B2 | 6/2008 | Anderson |
| 8,158,731 B2 | 4/2012 | Stefanisin |
| 8,178,190 B2 | 5/2012 | Savagian |
| 8,512,852 B2 | 8/2013 | Shimizu |
| 8,530,021 B2 | 9/2013 | Bartusiak |
| 8,748,543 B2 | 6/2014 | Masuda |
| 8,883,290 B2 | 11/2014 | Lowe |
| 9,096,782 B2 | 8/2015 | Takahira |
| 9,175,181 B2 | 11/2015 | Butler |
| 2002/0094444 A1 | 7/2002 | Nakata |
| 2003/0021973 A1 | 1/2003 | Topolkaraev |
| 2003/0215628 A1 | 11/2003 | Ma |
| 2003/0216496 A1 | 11/2003 | Mohanty |
| 2004/0005136 A1 | 1/2004 | Okumura |
| 2004/0068059 A1 | 4/2004 | Katayama |
| 2004/0122174 A1 | 6/2004 | Mather |
| 2004/0127650 A1* | 7/2004 | De Koning ......... C08F 283/006 525/242 |
| 2005/0112352 A1 | 5/2005 | Laney |
| 2005/0175833 A1 | 8/2005 | Yoneda |
| 2006/0188706 A1 | 8/2006 | Kobayashi |
| 2006/0257676 A1* | 11/2006 | Itada ..................... B29C 55/005 428/480 |
| 2006/0269710 A1 | 11/2006 | Inglis |
| 2007/0255013 A1 | 11/2007 | Becraft |
| 2009/0018237 A1 | 1/2009 | Fujii |
| 2009/0123728 A1 | 3/2009 | Cheung |
| 2009/0152095 A1 | 6/2009 | Kawahara |
| 2009/0162683 A1 | 6/2009 | Douard |
| 2010/0013121 A1 | 1/2010 | Hashimoto |
| 2010/0040904 A1 | 2/2010 | Cloutier |
| 2010/0316845 A1 | 12/2010 | Rule |
| 2011/0086998 A1 | 4/2011 | Kusunoki |
| 2011/0091666 A1* | 4/2011 | Wang ..................... B41M 5/52 428/32.21 |

(56) References Cited

U.S. PATENT DOCUMENTS

| | | | |
|---|---|---|---|
| 2011/0092622 A1* | 4/2011 | Kaneda | C08K 5/34928 524/100 |
| 2011/0196076 A1 | 8/2011 | Yoshino | |
| 2011/0207858 A1 | 8/2011 | Pfaadt | |
| 2011/0224342 A1 | 9/2011 | Masuda | |
| 2011/0244185 A1 | 10/2011 | Dou | |
| 2011/0244186 A1* | 10/2011 | Dou | B32B 27/08 428/156 |
| 2011/0256338 A1 | 10/2011 | Ausen | |
| 2011/0287237 A1* | 11/2011 | Riebel | B32B 27/06 428/195.1 |
| 2012/0122745 A1 | 5/2012 | Mullen | |
| 2012/0135169 A1 | 5/2012 | Tangelder | |
| 2012/0149844 A1 | 6/2012 | Whitehouse | |
| 2012/0211918 A1 | 8/2012 | Ausen | |
| 2012/0270978 A1* | 10/2012 | Myers | C08K 5/11 524/310 |
| 2012/0296015 A1* | 11/2012 | Van Heemst | C08L 3/02 524/53 |
| 2012/0315454 A1 | 12/2012 | Wang | |
| 2013/0156946 A1 | 6/2013 | Wada | |
| 2013/0184386 A1 | 7/2013 | Coudyser | |
| 2013/0236723 A1 | 9/2013 | Ishiguro | |
| 2013/0273353 A1 | 10/2013 | Ting | |
| 2013/0310288 A1 | 11/2013 | Mullen | |
| 2014/0138025 A1 | 5/2014 | Bartusiak | |
| 2014/0272357 A1 | 9/2014 | He | |
| 2015/0037526 A1 | 2/2015 | Seth | |
| 2015/0361231 A1 | 12/2015 | Li | |
| 2016/0304751 A1 | 10/2016 | Mussig | |
| 2017/0313912 A1 | 11/2017 | Zhou | |
| 2019/0099991 A1 | 4/2019 | Zhou | |
| 2019/0136045 A1 | 5/2019 | Merrill | |
| 2019/0185662 A1 | 6/2019 | Zhou | |
| 2019/0218423 A1 | 7/2019 | Bartusiak | |
| 2019/0256677 A1 | 8/2019 | Fishman | |
| 2019/0284351 A1 | 9/2019 | Yaguchi | |
| 2019/0284357 A1 | 9/2019 | Merrill | |

FOREIGN PATENT DOCUMENTS

| | | |
|---|---|---|
| CN | 102099186 | 6/2011 |
| CN | 103265798 | 8/2013 |
| DE | 202006001693 | 3/2006 |
| EP | 0373646 | 6/1990 |
| EP | 0587069 | 3/1994 |
| JP | 04242109 | 8/1992 |
| JP | 09151310 | 6/1997 |
| JP | 2000-289169 | 10/2000 |
| JP | 2004-010843 | 1/2004 |
| JP | 2005-143413 | 6/2005 |
| JP | 2007-217513 | 8/2007 |
| JP | 2009-107669 | 5/2009 |
| JP | 2011-006615 | 1/2011 |
| JP | 2011-136428 | 7/2011 |
| JP | 2012-192636 | 1/2012 |
| JP | 2013-001024 | 1/2013 |
| JP | 2013-147580 | 8/2013 |
| JP | 2014-001261 | 1/2014 |
| JP | 2015-120807 | 7/2015 |
| WO | WO 1992-004413 | 3/1992 |
| WO | WO 9204413 * | 3/1992 |
| WO | WO 1994-006856 | 3/1994 |
| WO | WO 1994-007949 | 4/1994 |
| WO | WO 1998-015601 | 4/1998 |
| WO | WO 1998-029516 | 7/1998 |
| WO | WO 1998-040434 | 9/1998 |
| WO | WO 1999-003907 | 1/1999 |
| WO | WO 2007-027163 | 3/2007 |
| WO | WO 2007-084291 | 7/2007 |
| WO | WO 2008-051443 | 5/2008 |
| WO | WO 2008-130225 | 10/2008 |
| WO | WO 2009/120311 | 10/2009 |
| WO | WO 2010-055903 | 5/2010 |
| WO | WO 2010-078134 | 7/2010 |
| WO | WO 2010-088067 | 8/2010 |
| WO | WO 2010-118041 | 10/2010 |
| WO | WO 2011-060001 | 5/2011 |
| WO | WO 2011-082052 | 7/2011 |
| WO | WO 2011-123682 | 10/2011 |
| WO | WO 2012-148421 | 11/2012 |
| WO | WO 2013-093781 | 6/2013 |
| WO | WO 2013-118023 | 8/2013 |
| WO | WO 2013-184822 | 12/2013 |
| WO | WO 2014-061243 | 4/2014 |
| WO | WO 2014-172185 | 10/2014 |
| WO | WO 2014-176509 | 10/2014 |
| WO | WO 2015-157350 | 10/2014 |
| WO | WO 2016-105998 | 6/2016 |
| WO | WO 2017-105887 | 6/2017 |
| WO | WO 2017-112386 | 6/2017 |
| WO | WO 2017-142730 | 8/2017 |
| WO | WO 2017-200756 | 11/2017 |
| WO | WO 2017-222863 | 12/2017 |

OTHER PUBLICATIONS 3M (TM) Screen printing UV Ink 9802 Opaque Black, 2016, pp. 02-03.

Anderson, "Toughening Polylactide", Polymer reviews, 2008, vol. 48, pp. 85-108.

El-Hadi, "Effect of processing conditions on the development of morphological features of banded or nonbanded spherulites of poly(3-hydroxybutyrate) (PHB) and polylactic acid (PLLA) blends", Polymer engineering and science, 2011, pp. 2191-2202.

FG00099—Vutek® GSLXR 3M Superflex Ink, 2015, pp. 03.

Gajria, "Miscibility and Biodegradability of Blends of Poly (Lactic Acid) and Poly (Vinyl Acetate)," Polymer, Feb. 1996, vol. 37, No. 3, pp. 437-444.

Gottfried, "Principles of Aging", Resistance and Stability of Polymers, 2013, pp. 01-138.

Hansen,"Vae Based Polymers for Biobased Products", Wacker Polymers, 2011, pp. 01-23.

Hong, "Miscibility and Physical Properties of Poly (Lactic Acid) (PLA) and Poly (Vinyl Acetate) (PVAc) Blends," Polymeric Materials: Science & Engineering, 2009, vol. 101, pp. 960-961.

HP Safety Data Sheet, C4940 Series, 9380 Version No. 02, 2015, 1 page.

Ikada, "Stereocomplex Formation Between Enantiomeric Poly(lactides)", Macromolecules, 1987, vol. 20, No. 04, pp. 904-906.

Jamshidian, "Poly-Lactic Acid: Production, Applications, Nanocomposites, and Release Studies," Comprehensive Reviews in Food Science and Food Safety, Sep. 2010, vol. 9, No. 5, pp. 552-571.

Kasai, "Nucleating Agents for Inducing the Crystallization of PLA—Ecopromote,", Innovation Takes Root Conference, 2012, 35 pages.

Levamelt, "Protection Energized by Lanxess", Product Brochure, 16 pages.

Lim, "Processing Technologies for Poly (Lactic Acid)," Progress in Polymer Science, Aug. 2008, vol. 33, No. 8, pp. 820-852.

Material Safety Data Sheet, The Hallstar Company, 3 pages.

Mulligan, "Nonlinear mechanooptical behaviour of uniaxially stretched poly(lactic acid): Dynamic phase behaviour", Macromolecules, 2005, vol. 38, pp. 2333-2344.

Natureworks LLC, "Ingeo Biopolymer 2003D Technical Data Sheet for Fresh Food Packaging and Food Serviceware", 3 pages.

Natureworks LLC, "Ingeo Resin Product Guide", 2 pages.

Natureworks LLC, "Ingeo Biopolymer 4032D Technical Data Sheet, Biaxially Oriented Films—High Heat", 3 pages.

Randall,"Enhancing Performance of Biopolymers Through Polymer and Formulation Design", NatureWorks LLC, Bioplastics Compounding and Processing, May 2012, 39 pages.

Roland Data Sheet,"ECO-SOL MAX2, ESL4-CY, ECO-SOL MAX2, ESL4-4CY, v. G_5.0", Dec. 21, 2015, 1 page.

Roland, "ECO-SOL MAX2, ESL4-CY and ECO-SOL MAX2,ESL4-4CY", 2015, 1page.

(56) References Cited

OTHER PUBLICATIONS

Shin, "Miscibility of biodegradable aliphatic polyster and poly(vinyl acetate) blends", J. Appl. Polym Sci, 2000, vol. 77, pp. 1348-1352.
Sivalingam, "Blends of poly(ε-caprolactone) and poly(vinyl acetate): mechanical properties and thermal degradation, Polymer degradation and stability", 2004, vol. 84, pp. 345-351.
Suryanegara, "The Synergetic Effect of Phenylphosphonic Acid Zinc and Microfibrillate Cellulose on the Injection Molding Cycle Time of PLA Composites," Cellulose, Jun. 2011, vol. 18, No. 3, pp. 689-698.
Synbra, Datasheet: Good flow: Compounding, Synterra® PDLA 1010, Version: 2012-07, 1 page.
Synbra, Datasheet: High Molecular Weight for Extrusion, Synterra® 78PDLA 1510, Version: 2012-07, 1 page.
Trejo, "Fungal degradation of polyvinyl acetate", Ecotoxicology and environmental safety, 1988, vol. 16, pp. 25-35.
Tsai, "Crystallinity and dimensional stability of biaxial oriented poly(lactic acid) films", Polymer degradation and stability, 2010, vol. 95, pp. 1292-1298.
Tsuji, "Isothermal and Non-Isothermal Crystallization Behavior of Poly(L-Lactic Acid): Effects of Stereocomplex as Nucleating Agent", Polymer, 2006, vol. 47, Issue 15, pp. 5430.
Tsuji, "Water vapor permeability of poly(lactide)s: Effects of molecular characterstics and crystallinity", Journal of applied polymer science, 2006, vol. 99, pp. 2245-2252.
Tsuji, "Isothermal and no-isothermal crystallization behavior of poly(L-lactic acid): Effects of stereocomplex as nucleating agent", Polymer, 2006, vol. 47, No. 15,pp. 5430.
Vertellus, "Citroflex® A-4 Technical Data Sheet", Vertellus Specialties Inc. 2006, 2 pages.
Vinnapas, Technical data sheet, 2010, 2 pages.
Wacker Biosolutions, Technical Data Sheet for Vinnex 2510, 2 pages.
Wacker Polymers, Technical Data Sheet for Vinnapas UW 4 FS, 2010, 2 pages.
Wacker, "Vinnex—Enabling The Next Generation of Bioplastics", 24 pages.
International Search report for PCT International Application No. PCT/US2017/036686 dated Sep. 11, 2017, 4 pages.
ASTM D882-10, "Standard Test Method for Tensile Properties of Thin Plastic Sheeting," downloaded Jan. 21, 2020, 10 pages.
Bruggemann, Oliver, "Polyvinylacetate," RöMPP online, Dec. 31, 2009, XP 055591580, retrieved from the Internet: https//roempp.thieme.de/roempp4.0/data/RD-16-03642 [retrieved on May 24, 2019], 2 pages.
"Vertellus—Citorflex A-4 Plasticizer" (https://www.vertellus.com/products/plastics-polymers/citroflex-plasticizers/citroflex-a-4-plasticizer-acetyl-tributyl-citrate) (webpage retrieved Apr. 27, 2019) (Year: 2019).
"Wacker Polymers—VINNAPAS (5279e)" (Jun. 2006) (Year: 2006).
"Wacker Polymers—VINNEX (7002E)" (Aug. 2013) (Year: 2013).
"Wacker Polymers—VINNAPAS (6766E)" (May 2011) (Year: 2011).
"Wikipedia—Polylactic Acid" (https://en.wikipedia.org/wiki/Polyactic_acid) (webpage retrieved Dec. 8, 2018) (Year: 2018).
International Search Report for PCT International Application No. PCT/US2015/065557, dated Mar. 14, 2016, 5 pages.
Aldrich Data Sheet (Year: 2019).
Krouse, "Stereocomplex Formation Between Enantiomeric Poly(lactides)", Macromolecules, 1987, vol. 20, No. 4, pp. 904-906.
Sivalingam, "Enzymatic degradation of poly(ε-caprolactone) and poly(vinyl acetate) and their blends by lipases," Chemical Engineering Science, 2003, vol. 58, pp. 2911-2919.
International Search Report for PCT International Application No. PCT/US2017/031043, dated Aug. 17, 2017, 5 pages.
International Search report for PCT International Application No. PCT/US2016/064897 dated Mar. 17, 2017, 6 pages.
International Search Report for PCT International Application No. PCT/US2017/016699, dated Jul. 11, 2017, 5 pages.
Gotto, "PolyLactic Acid (PLA) is Gaining Traction in the market," Polymer Innovation Blog, retrieved on Sep. 15, 2020, Year: 2020, 9 pages.

\* cited by examiner

GRAPHIC ARTICLES COMPRISING POLYLACTIC ACID POLYMER BASED FILM

CROSS REFERENCE TO RELATED APPLICATIONS

This application is a national stage filing under 35 U.S.C. 371 of PCT/US2017/036686, filed Jun. 9, 2017, which claims the benefit of U.S. Provisional Application No. 62/352,639, filed Jun. 21, 2016, the disclosure of which is incorporated by reference in its/their entirety herein.

SUMMARY

In one embodiment, an article is described comprising a first film layer comprising semicrystalline polylactic acid polymer; polyvinyl acetate polymer having a Tg of at least 25° C.; and plasticizer; wherein the article is a graphic film.

DETAILED DESCRIPTION

Figure 1:
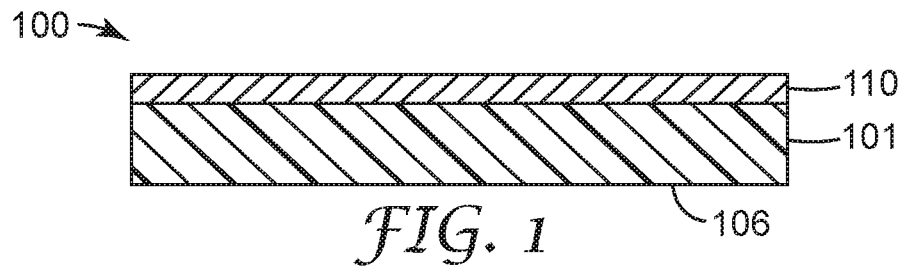
FIGS. 1-8 are schematic cross-sections of various graphic films.

The graphic articles described herein comprises at least one later, i.e. a first film layer comprising a polylactic acid ("PLA") polymer film. Lactic acid is a renewable material obtained by the bacterial fermentation of corn starch or cane sugar, and thus is considered a natural or in otherwords "biomass" material. Lactic acid has two optical isomers: L-lactic acid (also known as (S)-lactic acid) and D-lactic acid (also known as (R)-lactic acid), depicted as follows:

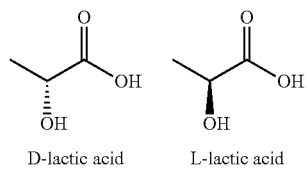

D-lactic acid   L-lactic acid

Polyesterification of lactic acid affords polylactic acid polymer.

More typically, lactic acid is typically converted to the cyclic lactide monomer, and the lactide undergoes ring opening polymerization, such as depicted as follows:

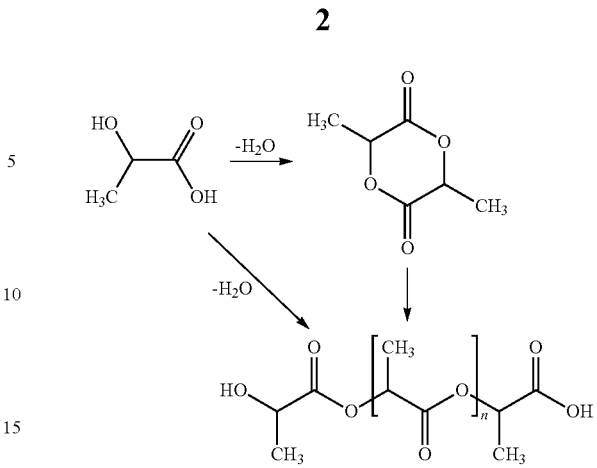

The resulting polymer material is typically referred to as polylactide polymer.

The degree of crystallinity, and hence many important properties, is largely controlled by the ratio of D and/or meso-lactide to L cyclic lactide monomer used. Likewise, for polymers prepared by direct polyesterification of lactic acid, the degree of crystallinity is largely controlled by the ratio of polymerized units derived from D-lactic acid to polymerized units derived from L-lactic acid.

The first film layer of the graphic articles described herein generally comprise a semicrystalline PLA polymer alone or in combination with an amorphous PLA polymer.

In some embodiments, the semicrystalline PLA polymer typically comprises at least 90, 91, 92, 93, 94, or 95 wt.-% of polymerized units derived from L-lactic acid (e.g. L-lactide) and no greater than 10, 9, 8, 7, 6, or 5 wt.-% of polymerized units derived from D-lactic acid (e.g. D-lactide and/or meso-lactide). In yet other embodiments, the semicrystalline PLA polymer comprises at least 96 wt.-% of polymerized units derived from L-lactic acid (e.g. L-lactide) and less than 4, 3, or 2 wt.-% of polymerized units derived from D-lactic acid (e.g. D-lactide and/or meso-lactide. Likewise the film comprises an even lower concentration of polymerized units derived from D-lactic acid (e.g. D-lactide and/or meso-lactide) depending on the concentration of semicrystalline PLA polymer in the film. For example, if the film composition comprises 15 wt.-% of a semicrystalline PLA having about 2 wt.-% D-lactide and/or meso-lactide, the film composition comprises about 0.3 wt.-% D-lactide and/or meso-lactide. The film generally comprises no greater than 9, 8, 7, 6, 5, 4, 3, 2, 1.5, 1.0, 0.5, 0.4, 0.3, 0.2, or 0.1 wt.-% polymerized units derived from D-lactic acid (e.g. D-lactide and/or meso-lactide). Suitable examples of semicrystalline PLA include Natureworks™ Ingeo™ 4042 D and 4032D. These polymers have been described in the literature as having molecular weight Mw of about 200,000 g/mole; Mn of about 100,000 g/mole; and a polydispersity of about 2.0.

Alternatively, the semicrystalline PLA polymer may comprises at least 90, 91, 92, 93, 94, or 95 wt.-% of polymerized units derived from D-lactic acid (e.g. D-lactide) and no greater than 10, 9, 8, 7, 6, or 5 wt.-% of polymerized units derived from L-lactic acid (e.g. L-lactide and/or meso-lactide). In yet other embodiments, the semicrystalline PLA polymer comprises at least 96 wt.-% of polymerized units derived from D-lactic acid (e.g. D-lactide) and less than 4, 3, or 2 wt.-% of polymerized units derived from L-lactic acid (e.g. L-lactide and/or meso-lactide. Likewise the film comprises an even lower concentration of polymerized units derived from L-lactic acid (e.g. L-lactide and/or meso-lactide) depending on the concentration of semicrystalline PLA polymer in the film. For example, if the film composition comprises 15 wt.-% of a semicrystalline PLA having about 2 wt.-% L-lactide and/or meso-lactide, the film composition comprises about 0.3 wt.-% L-lactide and/or meso-lactide. The film generally comprises no greater than 9, 8, 7, 6, 5, 4, 3, 2, 1.5, 1.0, 0.5, 0.4, 0.3, 0.2, or 0.1 wt.-% polymerized units derived from L-lactic acid (e.g. L-lactide and/or meso-lactide). Examples of such semicrystalline PLA are available as "Synterra™ PDLA".

The first film layer may further comprise an amorphous PLA polymer blended with the semicrystalline PLA. The inclusion of an amorphous PLA polymer can be preferred for improving the printability of the film with organic-solvent based inks.

In some embodiments, the amorphous PLA typically comprises no more than 90 wt.-% of polymerized units derived from L-lactic acid and greater than 10 wt.-% of polymerized units derived from D lactic acid (e.g. D-lactic lactide and/or meso-lactide). In some embodiments, the amorphous PLA comprises at least 80 or 85 wt.-% of polymerized units derived from L-lactic acid (e.g. L-lactide). In some embodiments, the amorphous PLA comprises no greater than 20 or 15 wt.-% of polymerized units derived from D-lactic acid (e.g. D-lactide and/or meso-lactide). A suitable amorphous PLA includes Natureworks™ Ingeo™ 4060 D grade. This polymer has been described in the literature to have a molecular weight Mw of about 180,000 g/mole.

Alternatively, the amorphous PLA typically comprises no more than 90 wt.-% of polymerized units derived from D-lactic acid and greater than 10 wt.-% of polymerized units derived from L lactic acid (e.g. L-lactic lactide and/or meso-lactide). In some embodiments, the amorphous PLA comprises at least 80 or 85 wt.-% of polymerized units derived from D-lactic acid (e.g. D-lactide). In some embodiments, the amorphous PLA comprises no greater than 20 or 15 wt.-%. of polymerized units derived from L-lactic acid (e.g. L-lactide and/or meso-lactide).

In some embodiments, both the semicrystalline and amorphous PLA polymers generally comprise high concentrations of polymerized units derived from L-lactic acid (e.g. L-lactide) with low concentrations of polymerized units derived from D-lactic acid (e.g. D-lactide).

In other embodiments, both the semicrystalline and amorphous PLA polymers generally comprise high concentrations of polymerized units derived from D-lactic acid (e.g. D-lactide) with low concentrations of polymerized units derived from L-lactic acid (e.g. L-lactide).

The PLA polymers are preferably "film grade" polymers, having a melt flow rate (as measured according to ASTM D1238) of no greater than 25, 20, 15, or 10 g/min at 210° C. with a mass of 2.16 kg. In some embodiments, the PLA polymer has a melt flow rate of less than 10 or 9 g/min at 210° C. The melt flow rate is related to the molecular weight of the PLA polymer. The PLA polymer typically has a weight average molecular weight (Mw) as determined by Gel Permeation Chromatography with polystyrene standards of at least 50,000 g/mol; 75,000 g/mol; 100,000 g/mol; 125,000 g/mol; 150,000 g/mol. In some embodiments, the molecular weight (Mw) is no greater than 400,000 g/mol; 350,000 g/mol or 300,000 g/mol.

The PLA polymers typically have a tensile strength ranging from about 25 to 150 MPa; a tensile modulus ranging from about 1000 to 7500 MPa; and a tensile elongation of at least 3, 4, or 5 ranging up to about 10 or 15%. In some embodiments, the tensile strength at break of the PLA polymer is at least 30, 35, 40, 45 or 50 MPa. In some embodiments, the tensile strength of the PLA polymer is no greater than 125, 100 or 75 MPa. In some embodiments, the tensile modulus of the PLA polymer is at least 1500, 2000, 2500, or 3000 MPa. In some embodiments, the tensile modulus of the PLA polymer is no greater than 7000, 6500, 6000, 5500, 5000, or 4000 MPa. Such tensile and elongation properties can be determined by ASTM D882 and are typically reported by the manufacturer or supplier of such PLA polymers.

The PLA polymers generally have a glass transition temperature, Tg, as can be determined by Differential Scanning calorimetry (DSC) as described in the forthcoming examples, ranging from about 50 to 65° C. In some embodiments, the Tg is at least 51, 52, 53, 54, or 55° C.

The semicrystalline PLA polymers typically have a (e.g. peak) melting point ranging from 140 to 175° C., 180° C., 185° C. or 190° C. In some embodiments, the (e.g. peak) melting point is at least 145, 150, or 155° C. The PLA polymer, typically comprising a semicrystalline PLA alone or in combination with an amorphous PLA polymer can be melt-processed at temperatures of 180, 190, 200, 210, 220 or 230° C. In one embodiment, PLA polymers can crystallize to form a stereocomplex (*Macromolecules,* 1987, 20 (4), pp 904-906). The PLA stereocomplex is formed when PLLA (a PLA homopolymer polymerized from mostly L-lactic acid or L-lactide units) is blended with PDLA (a PLA homopolymer polymerized from mostly D-lactic acid or D-lactide units). The stereocomplex crystal of PLA is of interest because the melting temperature of this crystal ranges from 210-250° C. The higher melting temperature stereocomplex PLA crystals increase the thermal stability of the PLA-based material. The PLA stereocomplex crystal is also know to effectively nucleate PLA homopolymer crystallization (Polymer, Volume 47, Issue 15, 12 Jul. 2006, Page 5430). This nucleation effect increases the overall percent crystallinity of the PLA-based material, thus increasing the material's thermal stability.

The first film layer typically comprises a semicrystalline PLA polymer or a blend of semicrystalline and amorphous PLA in an amount of at least 40, 45 or 50 wt.-%, based on the total weight of the PLA polymer, second (e.g. polyvinyl acetate) polymer, and plasticizer. The total amount of PLA polymer is typically no greater than 90, 85, 80, 75, or 70 wt.-% of the total weight of the PLA polymer, second (e.g. polyvinyl acetate) polymer, and plasticizer.

When the film composition comprises a blend of semicrystalline and amorphous PLA, the amount of semicrystalline PLA is typically at least 5, 10, 15 or 20 wt.-%, based on the total weight of the PLA polymer, second (e.g. polyvinyl acetate) polymer, and plasticizer. In some embodiments, the amount of amorphous PLA polymer ranges from 10, 15, 25 or 30 wt.-% up to 50, 55 or 60 wt.-% based on the total weight of the PLA polymer, second (e.g. polyvinyl acetate) polymer, and plasticizer. The amount of amorphous PLA polymer can be greater than the amount of crystalline polymer.

The film composition further comprises a second polymer such as polyvinyl acetate polymer. The second polymer can improve the compatibility of the PLA with a plasticizer such that the plasticizer concentration can be increased without plasticizer migration (as determined by the test method described in the forthcoming examples).

The second (e.g. polyvinyl acetate) polymer has a Tg of at least 25, 30, 35 or 40° C. The Tg of the second (e.g.

polyvinyl acetate) polymer is typically no greater than 80, 75, 70, 65, 60, 55, 50 or 45° C.

The second (e.g. polyvinyl acetate) polymer typically has a weight or number average molecular weight (as determined by Size Exclusion Chromatography with polystyrene standards) of at least 50,000 g/mol; 75,000 g/mol; 100,000 g/mol; 125,000 g/mol; 150,000 g/mol; 175,000 g/mol; 200,000 g/mol; 225,000 g/mol or 250,000 g/mol. In some embodiments, the molecular weight (Mw) is no greater than 2,000,000 g/mol; 1,500,000; 1,000,000 g/mol; 750,000 g/mol; 500,000 g/mol; 450,000 g/mol; 400,000 g/mol; 350,000 g/mol or 300,000 g/mol. In some embodiments, the molecular weight of the second (e.g. polyvinyl acetate) polymer is greater than the molecular weight of the PLA polymer(s). In one embodiment, the second (e.g. polyvinyl acetate) polymer may be characterized as having a viscosity in a 10 wt. % ethyl acetate solution at 20° C. ranging from 10 to 50 or 100 mPa*s. In another embodiment, the second (e.g. polyvinyl) acetate polymer may be characterized as having a viscosity in a 5 wt. % ethyl acetate solution at 20° C. ranging from 5 to 20 mPa*s.

In some favored embodiments, the second polymer is a polyvinyl acetate polymer. The polyvinyl acetate polymer is typically a homopolymer. However, the polymer may comprise relatively low concentrations of repeat units derived from other comonomers, provided that the Tg of the polyvinyl acetate polymer is within the ranges previously described. Other comonomers include for example acrylic monomers such as acrylic acid and methyl acrylate; vinyl monomers such as vinyl chloride and vinyl pyrollidone; and $C_2$-$C_8$ alkylene monomers, such as ethylene. The total concentration of repeats derived from other comonomers of the polyvinyl acetate polymer is typically no greater than 10, 9, 8, 7, 6, or 5 wt.-%. In some embodiments, the concentration of repeats derived from other comonomers of the polyvinyl acetate polymer is typically no greater than 4, 3, 2, 1 or 0.5 wt.-%. The polyvinyl acetate polymer typically has a low level of hydrolysis. The polymerized units of the polyvinyl acetate polymer that are hydrolyzed to units of vinyl alcohol is generally no greater than 10, 9, 8, 7, 6, 5, 4, 3, 2, 1 or 0.5 mol % of the polyvinyl acetate polymer.

Polyvinyl acetate polymers are commercially available from various suppliers including Wacker under the trade designation VINNAPAS™ and from Vinavil Americas Corporation, West Chicago, Ill. under the trade designation VINAVIL. Prior to combining with the PLA, such polyvinyl acetate polymers are often in a (e.g. white) solid powder or colorless bead form. In some embodiments, the polyvinyl acetate polymer (e.g. powder, prior to combining with the PLA polymer) is not water redispersible.

A single second (e.g. polyvinyl acetate) polymer may be utilized or a combinations of two or more second (e.g. polyvinyl acetate) polymers.

The total amount of second (e.g. polyvinyl acetate) polymer present in the first film layer described herein is at least about 10 wt.-% and typically no greater than about 50, 45, or 40 wt.-%, based on the total weight of the PLA polymer, second (e.g. polyvinyl acetate) polymer, and plasticizer. In some embodiments, the concentration of second (e.g. polyvinyl acetate) polymer is present in an amount of at least 15 or 20 wt.-%.

In some embodiments, the first film layer typically has a Tg of less than 30, 29, 28, 27, 26, 25, 24, 23, 22, 21, or 20° C. and does not exhibit plasticizer migration when aged at 80° C. for 24 hours (according to the test methods described in the examples). This property is attributable to the inclusion of the second (e.g. polyvinyl acetate) polymer.

The first film layer further comprises a plasticizer. The total amount of plasticizer in the film composition typically ranges from about 5 wt.-% to about 35, 40, 45 or 50 wt.-%, based on total weight of PLA polymer, second (e.g. polyvinyl acetate) polymer, and plasticizer. In some embodiments, the plasticizer concentration is at least 6, 7, 8, 9, 10, 11, 12, 13, 14, or 15 wt.-% of the film composition.

Various plasticizers that are capable of plasticizing PLA have been described in the art. The plasticizers are generally a liquid at 25° C. and typically have a molecular weight ranging from about 200 g/mol to 10,000 g/mol. In some embodiments, the molecular weight of the plasticizer is no greater than 5,000 g/mol. In other embodiments, the molecular weight of the plasticizer is no greater than 4,000, 3,000, 2,000 or 1,000 g/mol. Various combinations of plasticizers may be utilized.

The plasticizer preferably comprises one or more alkyl or aliphatic esters or ether groups. Multi-functional esters and/or ethers are typically preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable. Such plasticizers commonly further comprise linear or branched alkyl terminal group groups having a carbon chain length of $C_2$ to $C_{10}$.

In one embodiment, the plasticizer is a bio-based citrate-based plasticizer represented by the following Formula (I):

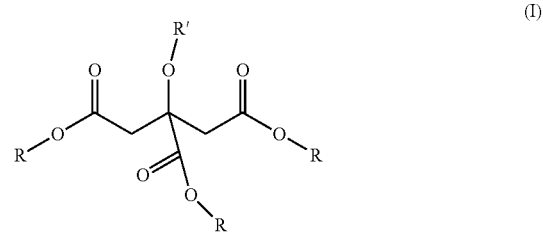

wherein

R are independently alkyl groups that may be the same or different; and

R' is an H or an ($C_1$ to $C_{10}$) acyl group.

R are typically independently linear or branched alkyl groups having a carbon chain length of $C_1$ to $C_{10}$. In some embodiments, R is a $C_2$ to $C_8$ or $C_2$ to $C_4$ linear alkyl group. In some embodiments, R' is acetyl. In other embodiments, at least one R is a branched alkyl groups having a carbon chain length of $C_5$ or greater. In some embodiments, the branched alkyl group has a carbon chain length no greater than 8.

Representative citrate-based plasticizer include for example triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate. One representative citrate-based plasticizer is acetyl tri-n-butyl citrate, available under the trade designation CITROFLEX A-4 PLASTICIZER from Vertellus Specialties, Incorporated, Indianapolis, Ind.

In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate available from Hallstar, Chicago, Ill. under the trade designation "TegMeR™ 809" and tetraethylene glycol di-ethylhexonate available from Hallstar, Chicago, Ill. under the trade designation "TegMeR™ 804".

In another embodiment, the plasticizer may be characterized as a polymeric adipate (i.e. a polyester derived from adipic acid) such as commercially available from Eastman, Kingsport, Tenn., as Admex™ 6995.

In another embodiment, the plasticizer is a substituted or unsubstituted aliphatic polyester, such as described in U.S. Pat. No. 8,158,731; incorporated herein by reference.

In some embodiments, the aliphatic polyester plasticizer comprises repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof.

In some embodiments, the aliphatic polyester plasticizer has the following formula:

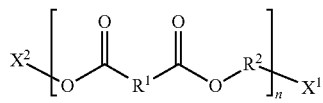

wherein n is 1 to 1000; $R^1$ is selected from the group consisting of a covalent bond and a substituted or unsubstituted aliphatic hydrocarbon group having 1 to 18 carbon atoms; $R^2$ is a substituted or unsubstituted aliphatic hydrocarbon group having 1 to 20 carbon atoms; $X^1$ is selected from the group consisting of —OH, —O$_2$C—R$^1$—CO$_2$H, and —O$_2$C—R$^1$—CO$_2$R$^3$; $X^2$ is selected from the group consisting of —H, —R$^2$—OH, and R$^3$; and $R^3$ is a substituted or unsubstituted aliphatic hydrocarbon group having 1 to 20 carbon atoms. In some embodiments, the polyester has the above formula with the proviso that if $X^1$ is —OH or —O$_2$C—R$^1$—CO$_2$H, then $X^2$ is $R^3$.

The number of repeat units n is selected such that the aliphatic polyester plasticizer has the previously described molecular weight.

In some embodiments, $R^1$, $R^2$, and/or $R^3$ are alkyl groups. $R^1$ alkyl groups can have, for example, from 1 to 18 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^1$, for example, can be selected from the group consisting of —(CH$_2$)$_2$—, —(CH$_2$)$_3$—, —(CH$_2$)$_4$—, and —(CH$_2$)$_8$—. $R^2$ alkyl groups can have, for example, from 1 to 20 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^2$, for example, can be selected from the group consisting of —(CH$_2$)$_3$—, —CH$_2$CH(CH$_3$)—, and —CH(CH$_3$)CH$_2$—. $R^3$ alkyl groups can have, for example, from 1 to 20 carbon atoms, from 1 to 18 carbon atoms, from 2 to 16 carbon atoms, from 3 to 14 carbon atoms, from 4 to 12 carbon atoms, from 6 to 12 carbon atoms, from 8 to 12 carbon atoms, and/or from 8 to 10 carbon atoms. $R^3$, for example, also can be a mixture comprising —(CH$_2$)$_7$CH$_3$ and —(CH$_2$)$_9$CH$_3$.

In some embodiments, $R^1$ is an alkyl group having from 1 to 10 carbons, $R^2$ is an alkyl group having from 1 to 10 carbons, and $R^3$ is an alkyl group having from 1 to 20 carbons. In other embodiments, $R^1$ is an alkyl group having from 2 to 6 carbons, $R^2$ is an alkyl group having from 2 to 6 carbons, and $R^3$ is an alkyl group having from 8 to 12 carbons. In still other embodiments, $R^1$ is an alkyl group having from 2 to 4 carbons, $R^2$ is an alkyl group having from 2 to 3 carbons, and $R^3$ is an alkyl group having from 8 to 10 carbons. In yet other embodiments, $R^1$ is selected from the group consisting of —(CH$_2$)$_2$—, —(CH$_2$)$_3$—, —(CH$_2$)$_4$—, and —(CH$_2$)$_8$—, $R^2$ is selected from the group consisting of —(CH$_2$)$_3$—, —CH$_2$CH(CH$_3$)—, and —CH(CH$_3$)CH$_2$—, and $R^3$ is a mixture comprising —(CH$_2$)$_7$CH$_3$ and —(CH$_2$)$_9$CH$_3$.

The aliphatic polyester plasticizer can have an acid value of about zero to about 20, or greater. The acid value of the polyesters can be determined by known methods for measuring the number of milligrams of potassium hydroxide necessary to neutralize the free acids in one gram of polyester sample.

Plasticizer with a low acid value is typically preferred for the shelf-life stability and/or durability of the film. In some embodiments, the acid value of the plasticizer is preferably no greater than 10, 9, 8, 7, 6, 5, 4, 3, 2 or 1.

The aliphatic polyester plasticizer can have a hydroxyl value of about zero to about 110, for example, about 1 to about 40, about 10 to about 30, about 15 to about 25, about 30 to about 110, about 40 to about 110, about 50 to about 110, and/or about 60 to about 90. The polyesters also can have a hydroxyl value greater than about 110. The hydroxyl value of the polyesters can be determined by known methods for measuring hydroxyl groups, such as the methods described by ASTM Test Method D 4274.

One representative aliphatic polyester plasticizer is available from Hallstar, Chicago, Ill., as the trade designation HALLGREEN R-8010™.

In some embodiments, the plasticizer compound typically has little or no hydroxyl groups. In some embodiments, the wt.-% percent of hydroxyl groups relative to the total weight of the plasticizer compound is no greater than 10, 9, 6, 7, 6, 5, 4, 3, 2, 1 wt.-%. In some embodiments the plasticizer compound contains no hydroxyl groups. Thus, in this embodiment, the plasticizer is not glycerol or water.

To facilitate the rate of crystallization, a nucleating agent may also be present in the PLA film composition. Suitable nucleating agent(s) include for example inorganic minerals, organic compounds, salts of organic acids and imides, finely divided crystalline polymers with a melting point above the processing temperature of PLA, and combinations of two or more of the foregoing. Suitable nucleating agents typically have an average particle size of at least 25 nanometers, or at least 0.1 micron. Combinations of two or more different nucleating agents may also be used.

Examples of useful nucleating agents include, for example, talc (hydrated magnesium silicate —H$_2$Mg$_3$(SiO$_3$)$_4$ or Mg$_3$Si$_4$O$_{10}$(OH)$_2$), silica (SiO$_2$), titania (TiO$_2$), alumina (Al$_2$O$_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic nucleating agent is present, the nucleating agent is typically at a concentration of at least 0.01, 0.02, 0.03, 0.04, 0.05, 0.1, 0.15 or 0.2 wt.-% ranging up to about 1, 2, 3, 4 or 5 wt.-% based on the total weight of the film composition. When the nucleating agent is an inorganic oxide filler such as silica, alumina, zinc oxide, and talc, the concentration can be higher.

In one embodiment, the nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored nucleating agent is zinc phenylphosphonate having the following chemical formula:

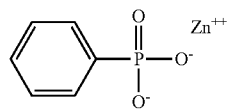

available from Nissan Chemical Industries, Ltd under the trade designation "Ecopromote".

In some embodiments, inorganic fillers may be used to prevent blocking or sticking of layers or rolls of the film during storage and transport. Inorganic fillers include clays and minerals, either surface modified or not. Examples include talc, diatomaceous earth, silica, mica, kaolin, titanium dioxide, perlite, and wollastonite.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a film composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, glutelins. In typical embodiments, the first film layer comprises little or no organic biomaterial fillers such a flour. Thus, the concentration of organic biomaterial filler (e.g. flour) is typically less than 10, 9, 8, 7, 6, 5, 4, 3, 2, or 1 wt.-% of the total film composition.

In some embodiments, the first film layer comprises an anti-blocking agent such as a fatty acid derivative. One suitable anti-blocking agent is a mixture of PLA polymer, 5-10 wt.-% of a fatty acid derivative and 20 to 40 wt.-% of silica, such as available under the trade designation SUKANO DC S511 from Sukano Polymers Corporation Duncan, S.C.

The first film layer may optionally contain one or more conventional additives. Additives include, for example, antioxidants, stabilizers, ultraviolet absorbers, lubricants, processing aids, antistatic agents, colorants, impact resistance aids, fillers (e.g. diatomaceous earth), matting agents, flame retardants (e.g. zinc borate), pigments (e.g. titanium dioxide), and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total film composition. In other embodiments, the concentration of additive can range up to 40, 45, 50, 55 or about 65 wt.-% of the total film composition.

The first PLA-based film, as described herein, may be a monolithic film or a film layer of a multilayer film. The first PLA-based film or film layer is typically unoriented, but optionally may be oriented.

When the film is a monolithic film, the thickness of the film is typically at least 10, 15, 20, or 25 microns (1 mil) to 500 microns (20 mils) thickness. In some embodiments, the thickness of the film is no greater than 2500, 2000, 1500, 1000, 800, 400, 300, 200, 150 or 50 microns. The film may be in the form of individual sheets, particularly for a thickness of greater than 50 mils. The (e g thinner) film may be in the form of a roll-good.

When the film is a film layer of a multilayer film, the multilayer film typically has the thickness just described. However, the thickness of the film layer may be less than 10 microns. In one embodiment, the film layer comprising the film composition described herein is an exterior layer or in other words a skin layer. A second film layer is disposed upon the skin layer. The second film layer typically has a different composition than the skin layer. In some embodiments, the second film is a PLA-based film having a different composition than the first film layer.

In preparing a first film composition as described herein, the PLA, second polymer such as PVAc, plasticizer, nucleating agent, etc. are heated (e.g. 180-250° C.) and thoroughly mixed using any suitable means known by those of ordinary skill in the art. For example, the film composition may be mixed by use of a (e.g., Brabender) mixer, extruder, kneader or the like.

Following mixing, the film composition may be formed into a (e.g. cast) film using known film-forming techniques, taking in to consideration the scale of the process and available equipment. In some embodiments, the PLA-based film composition is transferred to a press and then compressed and solidified to form individual sheets of PLA film. In other embodiments, the PLA-based film composition may be extruded through a die onto a casting roll maintained at a suitable cooling temperature to form a continuous length of PLA-based film. In some embodiments, during the film extrusion, the casting roll temperature is maintained preferably at 80 to 120° C. to obtain crystallization of PLA films on the casting roll.

The PLA-based films described herein can be used in a variety of graphic articles. In some embodiments, the PLA film has similar or even better properties to polyvinyl chloride (PVC) film, and thus can be used in place of PVC films. Thus, the film and articles described here can be free of polyvinyl chloride (PVC) film as well as phthalate plasticizers.

The film and film compositions can have various properties, as determined by the test methods set forth in the examples.

The first PLA-based film generally has a glass transition temperature ranging from about −20° C., −15° C., or −10° C. to 40° C.; below the Tg of both the PLA polymer and the second (e.g. polyvinyl acetate) polymer. In some embodiments, the film has a glass transition temperature of at least −5, −4, −3, −2, −1 or 0° C. In some embodiments, the film has a glass transition temperature of less than 35° C. or 30° C. or 25° C. In some embodiments, the film has a glass transition temperature of less than 20° C., 19° C., or 18° C.

The first PLA-based film typically has a melting temperature, $T_{m1}$ or $T_{m2}$, ranging from of at least about 150° C. or 155° C. to about 165° C., 170° C., 175° C., 180° C., 185° C. or 190° C. Further, the film composition can have a crystallization peak temperature $T_c$ ranging from 80° C., 90° C., or 100° C. ranging up to 120° C., 130° C., or 140° C.

The net melting endotherm is the energy of the melting endotherm less the energy of the crystallization exotherm (as described in further detail in the forthcoming examples). The net melting endotherm of the film compositions (i.e. taken from the microcompounder that are not melt pressed into a film) is determined by the second heating scan; whereas the net melting endotherm of the (e.g. melt pressed) film is determined by the first heating scan. According to U.S. Pat. No. 6,005,068, a PLA film is considered to be amorphous if it exhibits a net melting endotherm of less than about 10 J/g. In favored embodiments, such as when the film comprises a nucleating agent, the net melt enthalpy of the film, $\Delta H_{nm2}$ and $\Delta H_{nm1}$, respectively, is greater than 10, 11, 12, 13, 14 or 15 J/g and less than 40, 39, 38, 37, 36 or 35 J/g.

Figure 11:
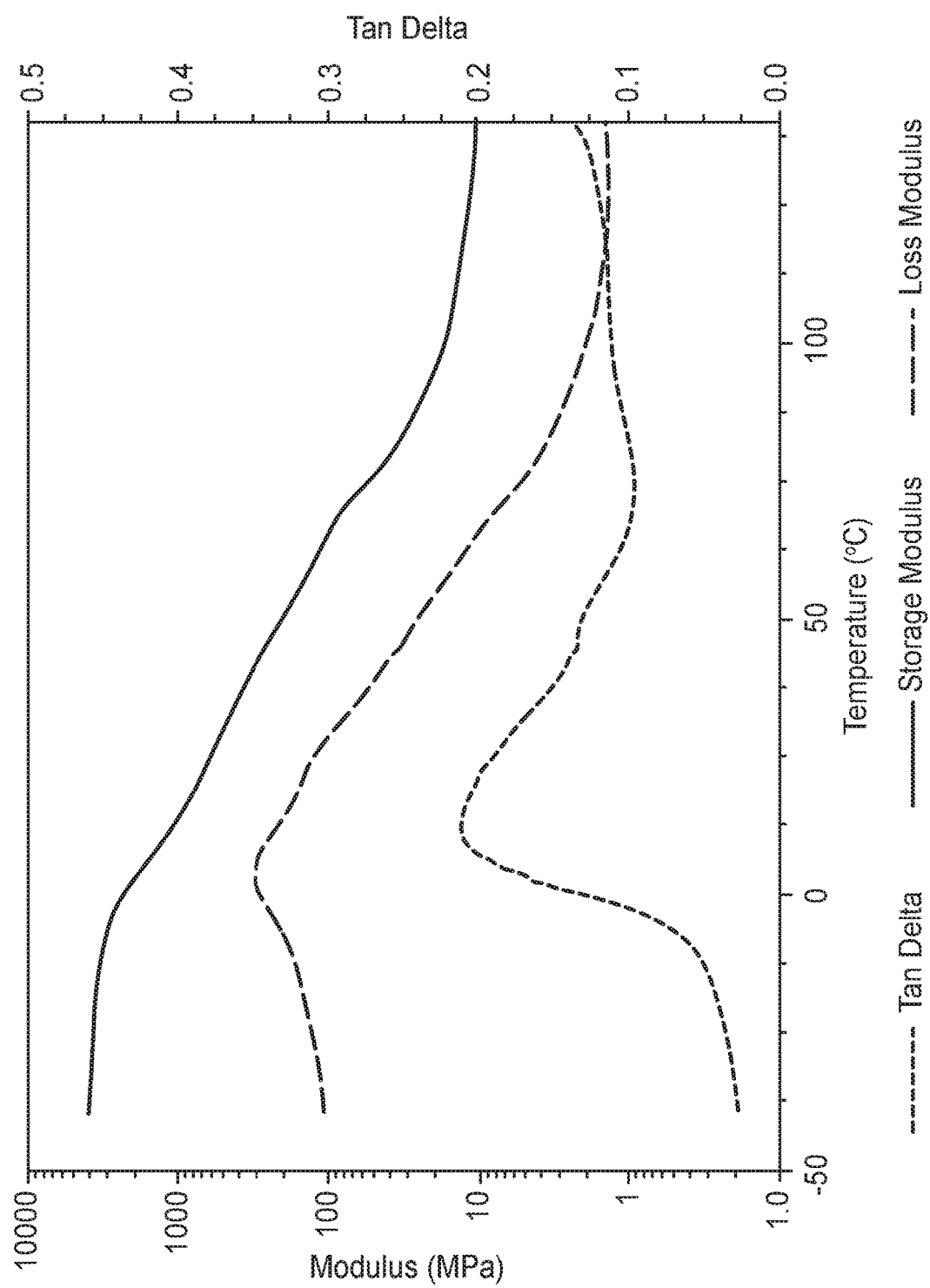
FIG. 11 depicts Dynamic Mechanical Analysis results of Example 12.
Figure 12:
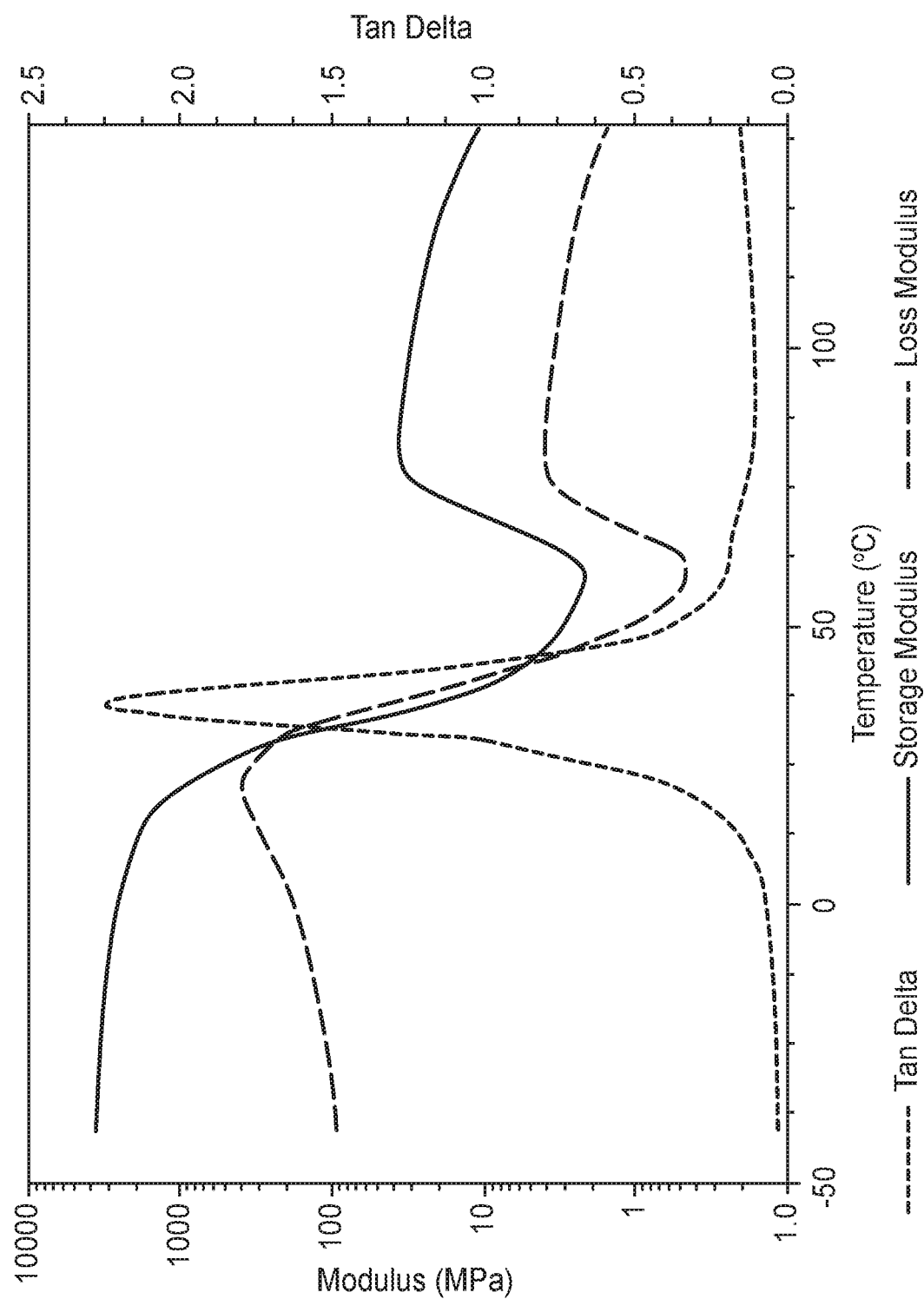
FIG. 12 depicts Dynamic Mechanical Analysis results of Example 16.

In one embodiment, the first PLA-based film has a Tg from −10 to 30° C. and a net melting endotherm, $\Delta H_{nm1}$, greater than 10 J/g and less than 40 J/g, as just described. Such films are flexible at room temperature and possess relatively high mechanical properties, such as modulus, upon heating to elevated temperatures as shown by the dynamical mechanical analysis (DMA) results in FIG. 11. In this embodiment, the film has a tensile storage modulus of at least 10 MPa and typically less than 10,000 MPa for a temperature range of −40° C. to 125° C. when heated at a rate of 2° C./min (i.e. the tensile storage modulus does not drop below 10 MPa when heated from −40 to 125° C. when heated at a rate of 2° C./min). In some embodiments, the film has a tensile storage modulus as determine by dynamic mechanical analysis of at least 5, 6, 7, 8, 9, or 10 MPa for a temperature range of 25° C. to 80° C. when heated at a rate of 2 C°/min. In contrast, as shown in FIG. 12, when the film has very low net melting endotherm, a dramatic decrease of mechanical properties, such as modulus, occurred as the temperature was increased above room temperature, 23° C.

The first PLA-based film can be evaluated utilizing standard tensile testing as further described in the forthcoming examples. The tensile strength of the film is typically at least 5 or 10 MPa and typically less than the tensile strength of the PLA and second (e.g. polyvinyl acetate) polymer utilized to make the film. In some embodiments, the tensile strength is no greater than 45, 40, 35, 34, 33, 32, 31, or 30 MPa. The elongation of the film is typically greater than that of PLA and second (e.g. polyvinyl acetate) polymer utilized to make the film. In some embodiments, the elongation is at least 30, 40 or 50%. In other embodiments, the elongation is at least 100%, 150% 200%, 250% or 300%. In some embodiments, the elongation is no greater than 600% or 500%. The tensile modulus of the film is typically at least 50, 100, or 150 MPa. In some embodiments, the tensile modulus is at least 200, 250 or 300 MPa. In some embodiments, the tensile modulus is no greater than 1000 MPa, 750 MPa or 650 MPa.

In some embodiments, the first PLA-based film layer is transparent having a transmission of visible light of at least 90 percent. When the first film layer is transparent, it can be utilized as any layer within the film, such as a backing, cover film, or intermediate layer (i.e. a layer between the outermost layers). In other embodiments, the first PLA-based film layer is opaque (e.g. white) or reflective and typically utilized as a backing or intermediate layer.

The film may optionally comprise a second (e.g. film) layer proximate the first film layer. In typical embodiments, the second layer is different than the first film layer. When the second layer is transparent having a transmission of visible light of at least 90 percent, it can be utilized as any layer of the graphic article such as a backing, cover film, or intermediate layer. When the second (e.g. film) layer is opaque (e.g. white) or reflective, it is typically utilized as a backing or intermediate layer. The graphic film can comprise more than one second layer. In one embodiment, a PLA-based film, as described herein, is utilized as a backing and a cover film with a graphic disposed between the backing and cover film.

The second layer may be in contact with the first film layer or a primer or adhesion-promoting treatment may be disposed between the first film layer and the second (e.g. film). In some embodiments, a layer of an adhesive composition is proximate the first PLA-based film layer or a second (e.g. film) layer. The adhesive is typically disposed directly on the first film layer or the second layer. Alternatively, a primer or adhesion promoting treatment may be disposed between the first film layer or second layer and the adhesive layer.

The graphic article may be a tape or sheet further comprising a (e.g. pressure sensitive) adhesive. For example, the PLA-based film 101 can be characterized as a backing film (as depicted in FIG. 1) comprising a graphic 110 disposed on one major surface and a (e.g. pressure sensitive) adhesive disposed on the opposing major surface 106 of the backing. The pressure sensitive adhesive typically further comprises a removable release liner.

In another embodiment, a sufficiently transparent layer of an adhesive composition may be disposed between the first film layer and a second (e.g. film) layer. The first film layer may be a backing, a cover film, or both the backing and the cover film. The graphic is typically positioned beneath the cover film or beneath the adhesive and cover film. Thus, the graphic is viewed through the cover film and optionally through the adhesive.

The PLA-based film may be subjected to customary surface treatments for better adhesion with the adjacent pressure sensitive adhesive layer. Surface treatments include for example exposure to ozone, exposure to flame, exposure to a high-voltage electric shock, treatment with ionizing radiation, and other chemical or physical oxidation treatments. Chemical surface treatments include primers. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. In one embodiment, the primer is an organic solvent based primer comprising acrylate polymer, chlorinated polyolefin, and epoxy resin as available from 3M Company as "3M™ Primer 94".

Various (e.g. pressure sensitive) adhesives can be applied to the PLA-based film such as natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than 3×10⁶ dynes/cm at a frequency of 1 Hz.

In certain embodiments, the pressure sensitive adhesive may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, Tex.). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al., incorporated by reference.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive. The heat activatable adhesives can be prepared from the same classes as previously described for the pressure sensitive adhesive. However, the components and concentrations thereof are selected such that the adhesive is heat activatable, rather than pressure sensitive, or a combination thereof.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The acrylic pressure sensitive adhesives may be produced by free-radical polymerization technique such as solution polymerization, bulk polymerization, or emulsion polymerization. The acrylic polymer may be of any type such as a random copolymer, a block copolymer, or a graft polymer. The polymerization may employ any of polymerization initiators and chain-transfer agents generally used.

The acrylic pressure sensitive adhesive comprises polymerized units of one or more (meth)acrylate ester monomers derived from a (e.g. non-tertiary) alcohol containing 1 to 14 carbon atoms and preferably an average of 4 to 12 carbon atoms. Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The acrylic pressure sensitive adhesive comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

$$H_2C=CR^1C(O)OR^8$$

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In typical embodiments, the acrylic pressure sensitive adhesive comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, isodecyl (meth)acrylate, lauryl (meth)acrylate, as well as esters of (meth)acrylic acid with an alcohol derived from a renewable source, such as 2-octyl (meth)acrylate.

The acrylic pressure sensitive adhesive typically comprises at least 50, 55, 60, 65, 70, 75, 80, 85, 90 wt-% or greater of polymerized units of monofunctional alkyl (meth)acrylate monomer having a Tg of less than 0° C., based on the total weight of the polymerized units (i.e. excluding inorganic filler or other additives).

The acrylic pressure sensitive adhesive may further comprise at least one high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C. High Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

The acrylic pressure sensitive adhesive may further comprise polymerized units of polar monomers. Representative polar monomers include for example acid-functional monomers (e.g. acrylic acid, methacrylic acid), hydroxyl functional (meth)acrylate) monomers, nitrogen-containing monomers (e.g. acrylamides), and combinations thereof. In some embodiments, the acrylic pressure sensitive adhesive comprises at least 0.5, 1, 2 or 3 wt-% and typically no greater than 10 wt-% of polymerized units of polar monomers, such as acrylamide and/or acid-functional monomers such as (meth)acrylic acid.

The pressure sensitive adhesive may further include one or more suitable additives according to necessity. The additives are exemplified by crosslinking agents (e.g. multifunctional (meth)acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The (e.g. pressure sensitive) adhesive layer may be disposed upon the film by various customary coating methods (e.g. gravure) roller coating, flow coating, dip coating, spin coating, spray coating, knife coating, (e.g. rotary or slit) die coating, (e.g. hot melt) extrusion coating, and printing. The adhesive may be applied directly to the PLA film described herein or transfer coated by use of release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

The release liner typically comprises paper or film, which has been coated or modified with compounds of low surface energy such as organosilicone compounds, fluoropolymers, polyurethanes and polyolefins. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

In some embodiments, the sheet or tape graphic articles comprises a low adhesion backsize provided on first major exposed surface of a PLA-based film, such that when the sheet or tape is in roll, the outwardmost (exposed) surface of the pressure-sensitive adhesive comes in contact with the low adhesion backsize. In one embodiment, the PLA-based film is a cover film. In this embodiment, the graphic does not come in contact with the low adhesion backsize.

Various low adhesion backsize compositions have been described in the art such as, for example, silicone, polyethylene, polycarbamate, polyacrylics, and the like.

The composition of low adhesion backsize is chosen (e.g., in combination with the composition of pressure-sensitive adhesive to provide an appropriate level of release. In some embodiments, the low adhesion backsize may also provide an enhanced ability to anchor paint which is deposited thereupon, just as described in US 2014/0138025.

General categories of exemplary materials which may be suitable for inclusion in low adhesion backsize include e.g. (meth)acrylic polymers, urethane polymers, vinyl ester polymers, vinyl carbamate polymers, fluorine-containing polymers, silicone-containing polymers, and combinations thereof.

In some embodiments, the low adhesion backsize is an organic solvent-based solution or a water-based emulsion.

In some embodiments, low adhesion backsize may comprises an acrylic composition that may be prepared from the same (meth)acrylate monomers as the acrylic adhesive. However, the low adhesion backsize composition typically comprises a lower concentration of low Tg monomer, such as octadecyl acrylate and a higher amount of high Tg monomer such as acrylic acid. In some embodiments, the low adhesion backsize comprises at least 40, 45 or 50 wt.-% ranging up to about 60 wt-% of polymerized units of low Tg monomer such as octadecyl acrylate. The weight percentages in connection with the low adhesion backsize described herein are with respect to the total solids not including any organic or aqueous solvent unless otherwise noted.

Such compositions are described in further detail in U.S. Pat. No. 3,011,988 to Luedke et al., incorporated by reference.

In some embodiments, low adhesion backsize may comprise a discernable crystalline melting point ($T_m$), e.g. in compositions comprising appreciable quantities of monomer units which give rise to crystalline polymer segments. Such a $T_m$ may be present instead of, or along with, a $T_g$. In some embodiments, a $T_m$, if present, may range between e.g. 20° C. and 60° C.

In some embodiments, low adhesion backsize may include at least some (meth)acrylic acid groups. In some embodiments, concentration of (meth)acrylic acid groups is at least 2, 3, 4, or 5 wt.-% ranging up to 10, 15, or 20 wt.-%.

In some embodiments, low adhesion backsize may comprise a silicone-containing material. In various embodiments, such materials may comprise a silicone backbone with non-silicone (e.g., (meth)acrylate) side chains; a non-silicone (e.g., (meth)acrylate) backbone with silicone side chains; a copolymer backbone comprising silicone units and non-silicone (e.g., (meth)acrylate) units; and the like. Silicone-polyurea materials, silicone-polyurea-polyurethane materials, silicone-polyoxamide materials, siloxane-iniferter-derived compositions, and the like, may also be suitable.

In a certain embodiments, the silicone-containing material of low adhesion backsize comprises a reaction product of a vinyl-functional silicone macromer having the general formula of Formula I:

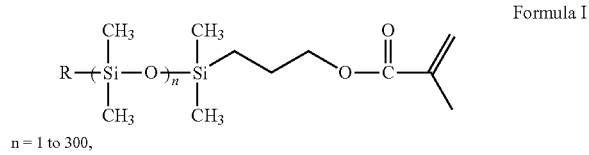

Formula I n = 1 to 300, and R is H or an alkyl group;

In certain embodiments, the silicone-containing material of low adhesion backsize comprises a reaction product of a mercapto-functional silicone macromer having the general formula of Formula IIa, IIb, or IIc or mixtures thereof:

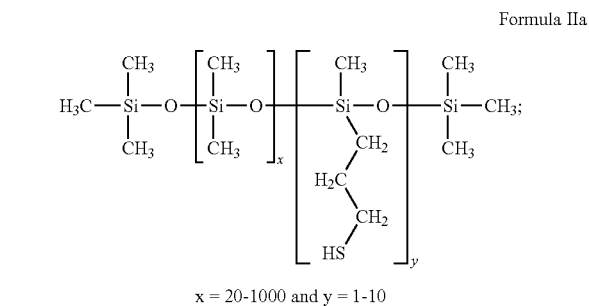

Formula IIa x = 20-1000 and y = 1-10

Formula IIb x = 20-1000

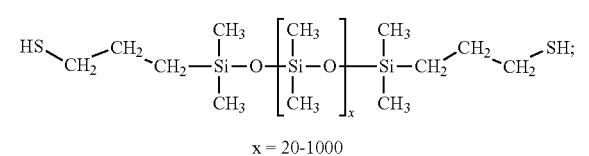

Formula IIc

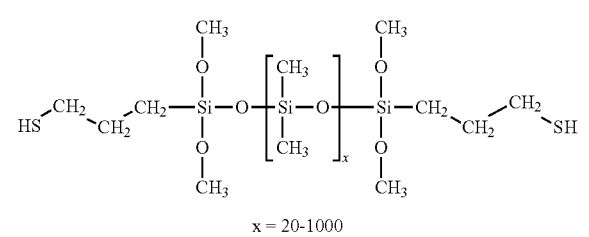

x = 20-1000

Further details of mercapto-functional silicone macromers and of the production of low adhesion backsize compositions using such macromers can be found in U.S. Pat. No. 5,032,460 to Kantner et al., which is incorporated by reference herein.

In various embodiments, any of the above silicone macromers may be used in combination with meth(acrylic) monomers and/or with any other vinyl monomers. Such monomers may be chosen, for example, in order to achieve any of the above-discussed glass transition temperature ranges. In some embodiments, the silicone macromer (e.g. of Formula IIa) may be used, at approximately 15-35 weight percent of the total reactants, with the balance of the reactants including at least one high $T_g$ (meth)acrylic monomer, at least one low $T_g$ (meth)acrylic monomer, and at least one (meth) acrylic acid monomer. In specific embodiments, the low $T_g$ monomer is methyl acrylate, the high $T_g$ monomer is methyl methacrylate, and the (meth)acrylic acid monomer is methacrylic acid. In further embodiments, in such compositions the silicone macromer (e.g. of Formula IIa) is used at approximately 20-30 wt. %.

In some embodiments comprising silicone macromers, the low adhesion backsize comprises at least 2, 3, 4, or 5 wt.-% of (meth)acrylic acid groups ranging up to 10, 15 or 20 wt.-%. In some embodiments, the components of pressure-sensitive adhesive and the low adhesion backsize when present are typically chosen to provide good adhesion to a surface, while also being removable under moderate force without leaving a (e.g. visible) residue.

In some embodiments, the graphic article described herein further comprises a second layer. The second layer may be a backing disposed between the adhesive and the PLA-based film and/or the second layer may be a transparent cover film disposed on a PLA-based backing film.

The backing can comprise a variety of flexible and inflexible (e.g. preformed web) substrates including but not limited to polymeric films, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, ethyl cellulose, as well as bio-based material such as polylactic acid (PLA).

In another embodiment, the first PLA-based film or backing may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The first film layer and second (e.g. film) layer may have the same thickness as the backing. However, the first and/or second (e.g. film) layer, particularly when utilized in combination with a backing, may be less than 10 microns. In some embodiments, the first and/or second film layer is typically at least 250 nm, 500 nm, 750 nm or 1 micron. The backing as well as the overall film is typically in the form of a roll-good, but may also be in the form of individual sheets.

In some embodiments, the second (e.g. film) layer is a thermoplastic polymer film such as polycarbonate, polyethylene terephthalate, polyamide, polyethylene, polypropylene, polystyren, polyvinyl chloride, poly(meth)acrylic polymers, ABS (acrylonitrile-butadiene-styrene copolymer) resins, and the like.

In some embodiments, the overall film, first film layer, cover film and/or backing is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable second film layers include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the film is sufficiently conformable such that it is "transversely curvable" meaning that the tape can be curved into a continuous curved shape (e.g. with a radius of curvature of 7.5 cm) that lies in a generally flat plane, without through-tearing of the stretched area of the curved portion of the tape. An example of a transversely curvable tape is depicted in FIG. 15 of US2014/0138025.

The adhesive coated graphic articles can exhibit good adhesion to both smooth and rough surfaces. Various rough surfaces are known including for example textured drywall, such as "knock down" and "orange peel"; cinder block, rough (e.g. Brazilian) tile and textured cement. Smooth surfaces, such as stainless steel, glass, and polypropylene have an average surface roughness (Ra) as can be measured by optical inferometry of less than 100 nanometer; whereas rough surfaces have an average surface roughness greater than 1 micron (1000 nanometers), 5 microns, or 10 microns. Sealed cement can have a rough or smooth surface depending on the thickness of the sealer. Cement sealers typically comprise polyurethane, epoxy resin, sodium silicate, or methylmethacrylate.

In some favored embodiments, the film is a graphic film used to apply designs, e.g. images, graphics, text and/or information (such as a code), on windows, buildings, pavements or vehicles such as autos, vans, buses, trucks, streetcars and the like for e.g. advertising or decorative purposes. Such designs, images, text, etc. will collectively be referred to herein as a "graphic". Many of the surfaces, e.g. vehicles, are irregular and/or uneven. In one embodiment, the graphic film is a decorative tape.

In some embodiments, the article is a floor marking graphic film tape that is typically adhered to (e.g. sealed) cement or other flooring surface.

The method of making a graphic film typically comprises providing a first PLA-based film, as described herein; and providing a graphic on the film. The PLA-based film is typically annealed prior to providing a graphic film. The film can be annealed at the time of manufacture or just prior to providing a graphic on the film, such as by printing. The annealing conditions can vary, ranging from 120° F. from about 12 hours to 200° F. for about 20 minutes. In some embodiments, the storage and/or transport environment of the film provides sufficient annealing.

Various methods may be used to provide a graphic on the film. Typical techniques include for example ink jet printing, thermal mass transfer, flexography, dye sublimation, screen printing, electrostatic printing, offset printing, gravure printing or other printing processes.

The graphic may be a single color or may be multi-colored. In the case of security markings, the graphic may be unapparent when viewed with wavelengths of the visible light spectrum. The graphic can be a continuous or discontinuous layer.

Figure 2:
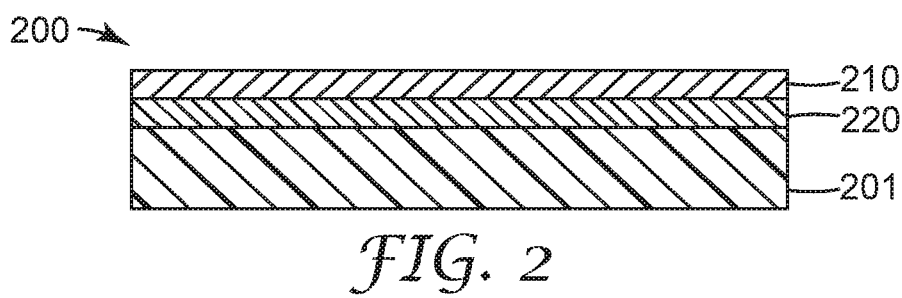

With reference to FIG. 1, the graphic article comprises a graphic 110 proximate a major surface of the first PLA-based film layer 101. The first film layer (101, 201, 301, 401, 501, 601, 701, 801) can be a monolithic film or a film layer comprising a semicrystalline polylactic acid polymer, polyvinyl acetate polymer having a Tg of at least 25° C., and plasticizer, as previously described. In another embodiment, with reference to FIG. 2, the graphic 210 may be disposed upon an (e.g. clear) ink-receptive (e.g. coating) layer 220. In this embodiment, the ink-receptive (e.g. coating) layer 220 is disposed on and typically in contact with the first film layer 201. Although not shown, each of the embodiments of FIGS. 3-8 may optionally further comprise an ink-receptive layer between the graphic and first film layer. The graphic (110, 210, 310, 410, 510, 610, 710) is typically permanently bonded to the first film layer or ink receptive layer 220.

The ink-receptive layer may be characterized as a primer for the ink. In some embodiments, the ink receptive layer can be characterized as a clear or colorless ink.

Various other ink-receptive (e.g. coating) layers are known including those described in U.S. Pat. Nos. 7,025,453; 6,881,458; and 6,846,075; incorporated herein by reference. Transparent ink can be utilized as an ink-receptive layer.

In some embodiments, the first PLA-based film layer (101, 201, 501, 601, 701, 801) can be characterized as a backing. The opposing major surface of the first film layer (e.g. 106 of FIG. 1) is typically bonded to a target surface by means of a (e.g. pressure sensitive) adhesive. The pressure sensitive adhesive is typically covered by a removable release liner as previously described.

In another embodiment, the first PLA-based film layer (301, 401, 601) can be characterized as a cover film. A (e.g. reverse imaged) graphic (310, 410, 610) is viewed through the cover film.

The graphic article can further comprise additional second layers, as previously described.

Figure 3:
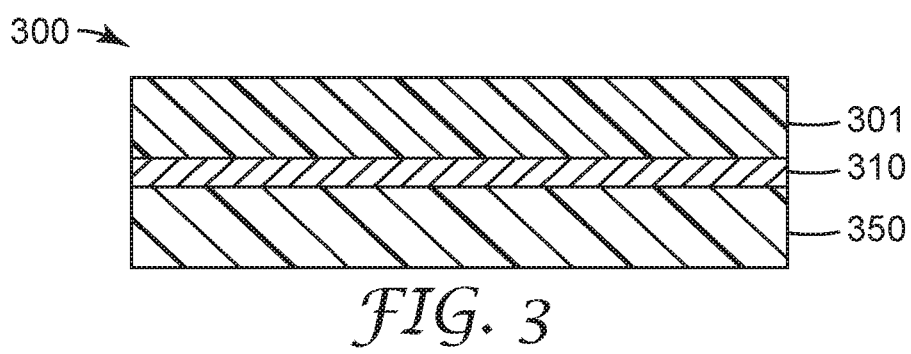

In one embodiment, as depicted in FIG. 3, the graphic article comprises a first PLA-based film layer 301 (e.g. cover film), graphic 310 proximate a major surface of a first film layer 301, and a backing 350 disposed on the opposing surface of graphic 310.

Figure 4:
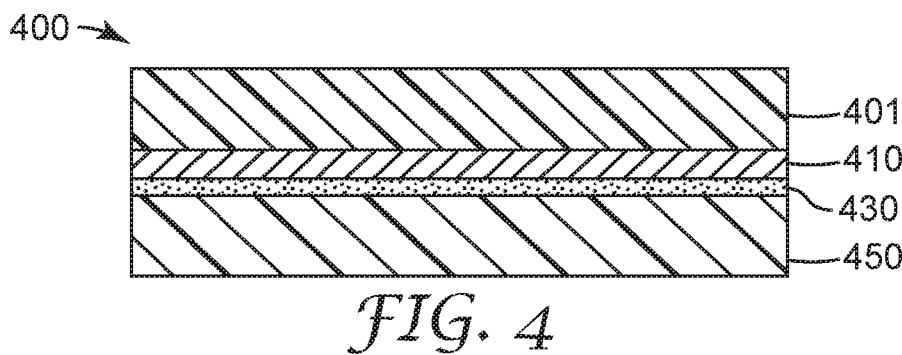

In another embodiment, as depicted in FIG. 4, the graphic article comprises a first PLA-based film layer 401 (e.g. cover film), graphic 410 proximate a major surface of a first film layer 401, a (e.g. pressure sensitive) adhesive 430 bonding the (e.g. reversed-imaged) film (401 together with 410) to backing 450.

Figure 5:
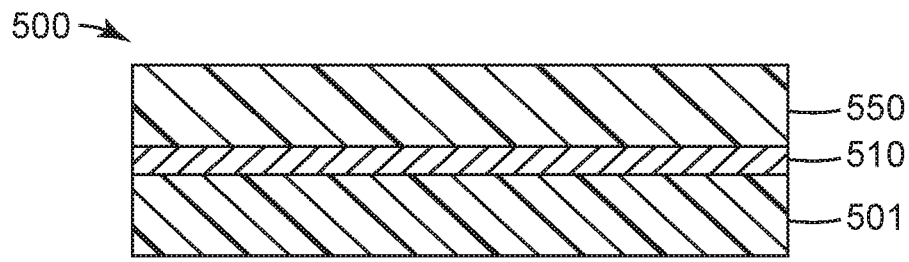

In another embodiment, as depicted in FIG. 5, the graphic article comprises a first PLA-based film layer 501, graphic 510 proximate a major surface of a first film layer 501, and a topcoat or cover film 550 disposed on the opposing surface of graphic 510.

Figure 6:
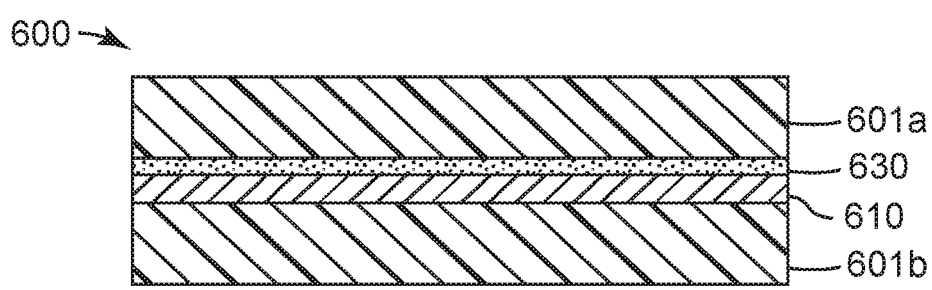

In another embodiment, as depicted in FIG. 6, the graphic article comprises a first PLA-based (e.g. opaque) film layer 601b, graphic 610 proximate a major surface of a first film layer 601, a (e.g. pressure sensitive) adhesive 630 bonding a (e.g. sufficiently transparent) first PLA-based film layer (e.g. cover film) 601a to the opposing surface of graphic 610.

Figure 7:
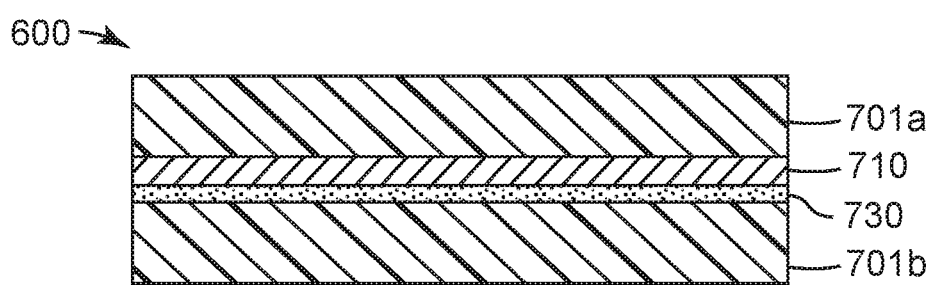

In another embodiment, as depicted in FIG. 7, the graphic article comprises a (e.g. sufficiently transparent) first PLA-based film layer 701a (e.g. cover film), a (e.g. reverse-imaged) graphic 710 proximate a major surface of the first film layer 701a, a (e.g. pressure sensitive) adhesive 730 bonding the (e.g. reversed-imaged) film (701 together with 710) to first film layer (e.g. backing) 701b.

Figure 8:
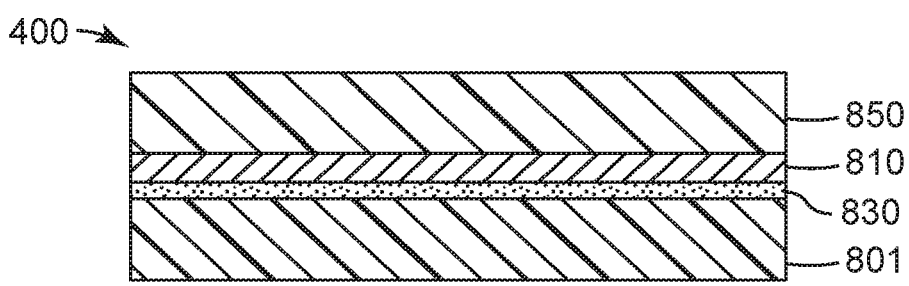

In the embodiments of FIG. 7-8, the first film layers (e.g. backing) 601b and 701b, and (e.g. sufficiently transparent) cover films 601a and 701a comprise a semicrystalline polylactic acid polymer, polyvinyl acetate polymer having a Tg of at least 25° C., and plasticizer, as previously described.

The backing (e.g. 350, 450) may be any of the flexible and inflexible substrates, as previously described. In some embodiments, the backing is a conformable film layer, as previously described. Further, the topcoat or cover film 550 may also be any of the sufficiently transparent (e.g. low surface energy) hardcoats, conformable films, etc. as previously described. In one embodiment, the topcoat comprise a transparent ink applied over a (e.g. colored) graphic.

In each of the embodiments of FIG. 1-7, the graphic is disposed upon the first film layer comprising a semicrystalline polylactic acid polymer, polyvinyl acetate polymer having a Tg of at least 25° C., and plasticizer, as previously described; or the graphic is disposed on an ink receptive layer, wherein the ink receptive layer is disposed on the PLA-based film.

However, in other embodiments, the graphic is disposed upon a second film, the second film does not comprises a semicrystalline polylactic acid polymer, polyvinyl acetate polymer having a Tg of at least 25° C., and plasticizer; as described herein. Alternatively, the graphic is disposed on an ink receptive layer, wherein the ink receptive layer is disposed on the second film. The second film is then bonded to a PLA-based film as described herein. For example, in one embodiment, as depicted in FIG. 8, the graphic article comprises a (e.g. sufficiently transparent) cover film 850, a (e.g. reverse-imaged) graphic 810 proximate a major surface of the cover film 850, a (e.g. pressure sensitive) adhesive 830 bonding the (e.g. reverse-imaged) cover film (850 together with 810) to first film layer (e.g. backing) 801. In this embodiment, the first film layer 801 comprises a PLA-based film, as described herein, and the cover film 850 comprises a different polymeric material, such as a different conformable film.

In another embodiment, not shown, the graphic film is the same as FIG. 4 except that the order of graphic 410 and adhesive 430 are switched with each other. The graphic film comprises a second (e.g. backing) film 450 comprising a graphic bonded with an adhesive to a first film layer (e.g. cover film) comprising a PLA-based film, as described herein.

Various other arrangements can be made wherein the graphic film comprises a PLA-based film, as described herein, in combination with a graphic.

The graphic typically comprises a dried and or cured ink layer. The dried ink layer can be derived from a wide variety of ink compositions including for example an organic solvent-based ink or water-based ink. The dried and cured ink layer can also be derived from a wide variety of radiation (e.g. ultraviolet) curable inks.

Colored inks typically comprise a colorant, such as a pigment and/or dye dispersed in a liquid carrier. The liquid carrier may comprise water, an organic monomer, a polymerizable reactive diluent in the case of radiation curable inks, or a combination thereof. For example, latex inks typically comprise water and (e.g. non-polymerizable) organic cosolvent.

A wide variety of organic and inorganic pigments are known in the art for use in inks. Suitable pigments include, but are not limited to, azo pigments such as condensed and chelate azo pigments; polycyclic pigments such as phthalocyanines, anthraquinones, quinacridones, thioindigoids, isoindolinones, and quinophthalones; nitro pigments; daylight fluorescent pigments; carbonates; chromates; titanium oxides; zinc oxides; iron oxides and carbon black. In one embodiment, the pigment is other than a white pigment, such as titanium dioxide. Pigments employed in the ink composition can include carbon black and pigments capable of generating a cyan, magenta and yellow ink. Suitable commercially available pigments include, for example, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3.

In some embodiments, such as ink jet printing inks, the pigment dispersion particles are sufficiently small to permit free flow of the ink through the ink jet printing device, and particularly the ink jet print nozzles, which typically have diameters in the range of from about 10 to about 50 microns, and more typically no greater than about 30 microns. In some embodiments, the pigment dispersion particles have diameter ranging from 50 nm to about 200 nm, and more typically no greater than 120 nm. Screen printing inks as well as materials utilized in other printing techniques as previously described, may utilize larger pigment particles. However, smaller sized pigment particles typically can also provide maximum color strength.

The organic solvent of the ink may be a single solvent or a blend of solvents. Suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; ethers such as tetraethylene glycol dimethyl ether and dialkylene glycol dialkyl ether including diethylene glycol diethyl ether; aromatic hydrocarbons such as toluene; isophorone; butyrolactone; N-methylpyrrolidone; tetrahydrofuran; esters such as lactates, acetates, including ethyl 3-ethoxypropionate and propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

Ink compositions, especially those that are durable for outdoor use, typically further comprise a polymeric binder. Binders are typically compatible with pigment particles such that upon evaporation of volatile components of the ink, the binders form films of the deposited pigments on the first film layer. Suitable binders include vinyl-containing polymers, acrylic-containing polymers, urethane-containing polymers, mixtures thereof, as well as binders that contain more than one type of such moieties, such as both urethane and (meth)acrylate moieties. In the case of radiation curable inks, the binder may be formed from the polymerization of the reactive diluent during curing of the ink.

In some embodiments, the ink layer is an ink-jet printed layer. Ink jet printing is a method of printing by spraying droplets of ink through computer-controlled nozzles. Ink jet printing ink typically has a viscosity ranging from about 3 to about 30 centipoise at the printhead operating temperature. Such inks preferably have a viscosity below about 25 or 20 centipoise at the desired ink jetting temperature (typically from ambient temperature up to about 65° C.). Ink jet compositions characteristically have moderate to low surface tension properties. Preferred formulations have a surface tension in the range of from about 20 mN/m to about 50 mN/m and more preferably in the range of from about 22 mN/m to about 40 mN/m at the printhead operating temperature. Further, ink jet inks typically have Newtonian or substantially Newtonian viscosity properties.

Inkjet printing principally relies on the use of four colors: cyan, magenta, yellow, and black (CMYK). However, to improve resolution of images, some printers identified above also add two additional colors that are less concentrated relatives of the cyan and magenta inks, called "light cyan" and "light magenta."

In one embodiment, the ink jet ink is a solvent-based ink comprising 1 to 5 part by weight colorant (e.g. pigment), 1 to 10 parts of oligomeric or polymeric binder, and up to 115 parts of various organic solvents as previously described including for example diethylene glycol diethyl ether, γ-butyrolactone, tetraethylene glycol dimethyl ether, and dialkylene glycol dialkyl ether. In one embodiment, the ink jet ink comprises (e.g. 40-50 wt.-%) diethylene glycol diethyl ether, (e.g. less than 20 wt.-%) γ-butyrolactone, (e.g. 10-20 wt.-%) tetraethylene glycol dimethyl ether, and (15-25 wt.-%) dialkylene glycol dialkyl ether.

In another embodiments, the ink jet ink may be a water-based ink or in otherwords an aqueous ink jet ink. The liquid medium typically comprises at least 50%, 60%, 70%, or 80% by weight distilled and/or deionized water and may comprise water in combination with one or more water-miscible organic solvents.

In one embodiment, the liquid medium of the aqueous ink jet ink comprises (e.g. 60-90%) water, no greater than 15% of an organic solvent, such as 2-pyrrolidone, and no greater than 5% of colorant, such as carbon black.

In other embodiments, the aqueous ink jet ink further comprises a polymeric binder, such as a latex binder, typically formed by emulsion polymerization. In one embodiment, the latex binder is formed by emulsion polymerization of a first monomer, having a higher glass transition temperature Tg, and a second monomer having a lower glass transition temperature Tg. The glass transition temperature of a monomer refers more specifically to the glass transition temperature of a homopolymer formed from the particular monomer. In one embodiment, the latex binder is formed from first monomer having a glass transition temperature Tg greater than about 70° C. The first monomer may comprise styrene, substituted styrene, methyl methacrylate or a mixture thereof. Substituted styrenes include alkyl-substituted styrenes, halogen-substituted styrenes and the like. In a preferred embodiment, the first monomer, or mixture thereof, has an average glass transition temperature Tg of about 100 C., or greater. The second monomer of the latex binder typically has a glass transition temperature Tg less than about 0° C. The second monomer may comprise an alkyl acrylate such as ethyl acrylate, propyl acrylate, butyl acrylate, octyl acrylate, ethylhexyl acrylate and the like. In some embodiments, the second monomer has a glass transition temperature Tg less than about −25° C. or −50° C. The ratio of the first and second monomers may be varied so that the latex binder has a glass transition temperature Tg in the range of from about 0° C. to 70° C.

The reaction medium for preparing the latex binder may employ a charge stabilizing agent and/or an emulsifier in order to obtain the desired particle size. The latex binder typically has an average particle size from 20 nm to 500 nm, and in some embodiments from 100 nm to 300 nm. The latex binder may have a weight average molecular weight ranging from 10,000 to 5,000,000 g/mole. Various charge stabilizing agents are known such as methacrylic acid, acrylic acid, and/or a (e.g. sodium) salt thereof. Various emulsion polymerization emulsifiers are also known such as a fatty (e.g. lauryl) acid ether sulfate.

The latex ink composition also typically comprise a dispersants and/or a humectant (also referred to as a cosolvent). Non-polymeric dispersants include naphthalene sulfonic acid, sodium lignosulfate, glycerol stearate, as well as phosphate containing surfactants. Numerous polymeric dispersants are known. Such polymers typically comprise both hydrophilic moieties for aqueous compatibility and hydrophobic moieties for interaction with the pigment are preferred.

In one embodiment, the aqueous ink jet ink composition may comprise pigment, co-solvent, dispersant and latex binder. The aqueous composition may comprise 1% to 10%, 15% or 20% pigment; at least 5% or 10% ranging up to 30%, 40% or to 50% co-solvent, 0.01% to 5 or 10% dispersant, and at least 1% or 2% ranging up to 5, 10, 15 or 20% latex binder.

Various aqueous latex (e.g. ink jet) ink are known, such as described in U.S. Pat. Nos. 9,175,181 and 6,498,202.

"Radiation curable" ink comprises components having functionality directly or indirectly pendant from the backbone that reacts (e.g. crosslinks) upon exposure to a suitable source of curing energy. Suitable radiation crosslinkable groups include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are typically preferred. Of these, (meth)acryl moieties are most preferred. The term "(meth)acryl", as used herein, encompasses acryl and/or methacryl.

The energy source used for achieving crosslinking of the radiation curable functionality may be actinic (e.g., radiation having a wavelength in the ultraviolet (UV) or visible region of the spectrum), accelerated particles (e.g., electron beam (EB) radiation), thermal (e.g., heat or infrared radiation), or the like with UV and EB being preferred. Suitable sources of actinic radiation include mercury lamps, xenon lamps, carbon arc lamps, tungsten filament lamps, lasers, electron beam energy, light emitting diodes, sunlight, and the like.

The radiation curable material may be mono-, di-, tri-, tetra- or otherwise multifunctional in terms of radiation curable moieties. The radiation curable material may be straight-chained, branched, and/or cyclic with branched materials tending to have lower viscosity than straight-chain counterparts of comparable molecular weight.

When the radiation curable material is a monomer it may be referred to as a reactive diluent. Various reactive diluents are suitable including acrylate monomers such as hexanedioldiacrylate, tetrahydrofurfuryl acrylate, isobornyl acrylate, ethoxyethoxyethyl acrylate, propoxylated neopentylglycol diacrylate, and trimethylolpropane triacrylate as well as vinyl monomers such as vinyl caprolactam.

In some embodiments, the radiation curable ink comprises at least 25, 30, 35, 40 wt.-% ranging up to 90 wt.-% or greater of weight percent of such reactive diluent monomers.

The radiation curable ink may optionally further comprise at least 5, 10, 15 or 30 wt.-% ranging up to 50 wt. % of organic solvent.

In one embodiment, the radiation curable ink comprises (e.g. 30-45 wt.-%) organic solvent such as (tetrahydrofurfuryl) alcohol and a mixture of acrylate and vinyl monomers. For example, the monomers may contain (e.g. 10 to 20 wt.-%) of vinyl caprolactam, (e.g. 10 to 20 wt.-%) isobornyl acrylate, (e.g. 1 to 5 wt.-%) propoxylated neopentyl glycol diacrylate, and (e.g. 1 to 5 wt.-%) cyclic trimetholpropane formal acrylate.

In other embodiments, the radiation curable ink composition further comprises one or more polymeric binders. The polymeric binder may be an oligomer or macromonomer having a number average molecular weight (Mn) of at least 3,000; 4,000; 5,000, or 6,000 g/mole ranging up to 10,000 or 15,000 g/mole. Alternatively, the polymeric binder may have a higher molecular weight.

In some embodiments, the polymeric binder comprises methylmethacrylate, isobutyl methacrylate or isobutylmethacrylate/isooctylacrylate repeating unit. The polymeric binder may have a methyl/methacrylate repeating unit and a methacrylic acid end group. The polymeric binder may be present in an amount of at least 10, 15, 20, or 25 wt.-% ranging up to 35, 40, 45, 50, 55, or 60 wt.-%. of the ink.

The water-based, solvent-based, and radiation curable ink may comprise a variety of optional additives. Such optional additives include one or more flow control agents, slip modifiers, thixotropic agents, surfactants (e.g. fluorochemical), foaming agents, antifoaming agents (e.g. silica and silicone oil), flow or other rheology control agents, waxes, oils, antioxidants, photoinitiators and photoinitiator stabilizers in the case of radiation curable inks, dispersants, gloss agents, fungicides, bactericides, organic and/or inorganic filler particles, leveling agents, opacifiers, antistatic agents, dispersants, and the like. To enhance durability of the design, image, etc., especially in outdoor environments exposed to sunlight, a variety of commercially available stabilizing chemicals can be added such as hydrolysis stabilizers, heat stabilizers, UV light stabilizers, and free-radical scavengers.

Inorganic fillers such as crystalline and amorphous silica, aluminum silicate, and calcium carbonate, etc. can be included to impart increased surface roughness, reduced gloss and improved dot gain. The concentration of inorganic fillers typically ranges from about 0.1% to about 10% by weight and preferably from about 0.5% to about 5%. The particle size is preferably less than one micron, more preferably less 0.5 microns, and most preferably less than about 0.2 microns.

Representative ink jet printing inks include for example HP Latex 360 Printer (HP 83 Inks), Roland XR-640 (Roland ESL4 Eco Inks), and EFI VUTEk GS3250LX Pro (EFI VUTEk GSLXr 3M™ SuperFlex UV Ink).

In another embodiment, the graphic comprises a screen printed ink. Screen printing is a method of printing by using a squeegee to force ink through an assembly of mesh fabric and a stencil. Screen printing inks also comprise polymeric binder dispersed in (e.g. 40 to 60 wt.-% of) liquid carrier, colorant (in the case of colored ink) as well as the previously described optional additives and inorganic fillers. However, screen printing inks can utilized higher molecular weight polymeric binders. Further, screen printing ink typically contain over 40% solids and have a viscosity of at least two orders of magnitude greater than the viscosity of ink jet printing inks.

In some embodiments, the screen printing ink may be an organic solvent-based screening printing ink that comprise an acrylic and/or vinyl polymeric binder. Suitable acrylic polymer binder include methyl methacrylate polymers and copolymers. In some embodiments, the screen printing ink may comprise 5 to 10 wt.-% of acrylic polymer binder. Suitable vinyl polymer binders include copolymer of vinyl acetate, vinyl alcohol and vinyl chloride. In some embodiments, the screen printing ink may comprise 10 to 20 wt.-% of vinyl polymer binder.

The screen printing ink may further comprise up to 15 wt-% of plasticizer(s) including polymeric plasticizer and phthalates (e.g. diundecyl phthalate), colorant (e.g. pigment), as well as 1 to 5 wt.-% of inorganic fillers as previously described. The organic solvent-based screen printing ink comprises 40 to 60 wt-% of organic solvent(s) as previously described. In one embodiment, the screen printing ink comprises (e.g. 35 to 45 wt.-%) cyclohexanone, (e.g. 10 to 20 wt.-%) of ethyl 3-ethoxy propionate, and (e.g. 5 to 10 wt.-%) 2-buoxyethyl acetate.

In other embodiments, the screen printing ink is a radiation curable ink comprising at least one polymer dispersed in reactive diluent(s) as the liquid carrier, colorant (in the case of colored ink) as well as the previously described optional additives and inorganic fillers. In one embodiment, the radiation curable screen printing ink comprises 10 to 20 wt.-% methylmethacrylate polymer, colorant (e.g. pigment), up to 5 wt.-% of inorganic fillers as previously described, and up to 90 wt. % of a mixture of reactive diluents. In one embodiment, the radiation curable screen printing ink comprises (e.g. 30 to 40 wt.-%) aromatic (meth)acrylate monomer, such as phenoxy ethyl acrylate, (e.g. 5 to 15 wt.-%) aliphatic urethane acrylate, (e.g. 10 to 20 wt.-%) of vinylcaprolactam, (e.g. 1 to 5 wt. %) of 1-propanone, 2-(dimethylamino)-1-[4-(4-morpholinyl)phenyl]-2-(phenylmethyl), (e.g. 1 to 5 wt. %) of 1-butanone, 2-(dimethylamino)-1-[4-(4-morpholinyl)phenyl]-2-(phenylmethyl), (e.g. 1 to 5 wt.-%) diethylene glycol ethyl ether acrylate, and (e.g. 1 to 5 wt.-%) propoxylated glycerol triacrylate.

Suitable examples of screen printing ink include 3M™ Screen Printing UV Ink 9802 Opaque Black, 3M™ Scotchlite™ Transparent Screen Printing Ink 2905 Black, as well as those described in U.S. Pat. No. 6,232,359.

In favored embodiments, the color density is at least 80, 85, 90, 95, or 100% of the color density that can be obtained with SCOTCHCAL IJ 170-10 cast vinyl film.

Objects and advantages of this invention are further illustrated by the following examples. The particular materials and amounts, as well as other conditions and details, recited in these examples should not be used to unduly limit this invention.

EXAMPLES

Unless otherwise noted, amounts of material are listed by weight, or by weight percent ("wt.-%").
Materials
INGEO 4032D—a semicrystalline polylactic acid (PLA) (2 wt. % D-lactide; weightaverage molecular weight≈200,000 g/mol), was purchased from Natureworks, LLC, Minnetonka, Minn.

INGEO 4060D—a amorphous polylactic acid (PLA) (10 wt. % D-lactide; weight average molecular weight≈180,000 g/mol), was purchased from Natureworks, LLC, Minnetonka, Minn.

VINNAPAS UW 4 FS—a polyvinyl acetate (Tg=42° C.; weight average molecular weight≈280,000 g/mol), was obtained from Wacker, Germany.

VINNAPAS UW 25 FS—a polyvinyl acetate (Tg=42° C.; weight average molecular weight≈480,000 g/mol), was obtained from Wacker, Germany.

CITROFLEX A4—acetyl tributyl citrate, a plasticizer, was obtained from Vertellus Performance Materials, Bayonne, N.J.

TEGMER 804—tetraethylene glycol di-ethylhexonate ester plasticizer, was obtained from Hallstar, Chicago, Ill.

TEGMER 809—PEG 400 di-ethylhexonate ester plasticizer, was obtained from Hallstar, Chicago, Ill.

ADMEX 6995—a polymeric adipate plasticizer (weight average molecular weight≈3200 g/mol) was obtained from Eastman Chemical Company, Kingsport, Tenn.

ECOPROMOTE—zinc phenylphosphonate, a nucleation agent, was obtained from Nissan Chemical Industrials (Japan).

TITANIUM DIOXIDE—titanium dioxide masterbatch (50 wt % loading in Ingeo PLA 4032D) was obtained from Clariant Corporation, Minneapolis, Minn.

Sample Preparation

Melt Compounding

Samples were prepared by mixing PLA, PVAc, plasticizer and nucleation agent in a hot melt extruder (DSM XPLORE) including 15 cm³ twin-screw micro-compounder at 100 RPM, 200° C. for 10 minutes, and then collecting the sample by opening a valve on the mixing chamber. The compounded samples were subjected to aging testing at 80° C., differential scanning calorimetry ("DSC") characterization and melt-pressed into films for tensile testing.

Melt Press to Make Films

The compounded samples were placed between two polytetrafluoroethylene sheets with a 10 mil (~250 micrometer) thick spacer in between. The Teflon sheets were placed between to metal sheets. The metal sheets with the sample disposed between were placed between the platens of a hydraulic press (available from Carver) and the platens were heated to 340° F. (171° C.). Each sample was preheated for 8 minutes without pressure and then pressed under a pressure of 300 pounds per square inch (~2.1 Newtons/square mm) for 5 minutes. Then, the metal plates were removed from the hydraulic press and allowed for air cooling.

Test Methods

Aging Test

The compounded samples (about 0.2 grams) were placed in closed scintillation vials to prevent plasticizer evaporation during aging testing, and aged in the oven at 80° C. for 24 hours. Then, after aging at 80° C., the sample's surface was inspected to see if there was plasticizer migration. Samples having an oily surface were considered to fail; whereas samples having a non-oily surface were considered to pass.

DSC—Differential Scanning Calorimetry

The glass transition temperature, crystallization temperature and crystallinity of each sample was measured using a TA INSTRUMENTS DIFFERENTIAL SCANNING CALORIMETER according to ASTM D3418-12 unless specified otherwise. Each sample (4~8 mg) was heated from −60° C. to 200° C. at 10° C./min in a first heating scan and held for 2 minutes to erase its thermal history, then cooled to −60° C. at 5° C./min in a first cooling scan, and heated to 200° C. at 10° C./min in a second heating scan. The first heating scan was used to determine Tm of the films. The second heating scan was used to determine Tg of the films. Various parameters were derived from the DSC as defined as follows:

$T_g$—refers to the midpoint temperature of the second heating scan, described as $T_{mg}$ in ASTM D3418-12.

$T_c$—refers to the crystallization peak temperature of the first cooling scan, described as $T_{pc}$ in ASTM D3418-12.

$T_{m1}$ and $T_{m2}$—refer to the melting peak temperature of the first and second heating scan, respectively, described as $T_{pm}$ in ASTM D3418-12.

The ability of the composition to crystallize was determined by calculating the net melting endotherm, $\Delta H_{nm2}$, associated with the crystalline material formed during the cooling scan was calculated with the following equation, $$\Delta H_{nm2} = \Delta H_{m2} - \Delta H_{cc2}$$

where $\Delta H_{m2}$ is the melting endotherm mass normalized enthalpy of the second heating scan and $\Delta H_{cc2}$ is the crystallization exotherm mass normalized enthalpy of the second heating scan (as described in section 11 of ASTM D3418-12). For the compositions comprising nucleating agent, $\Delta H_{cc2}$ was not detected and thus $\Delta H_{nm2} = \Delta H_{m2}$.

The net melting endotherm, $\Delta H_{nm1}$, is associated with the crystallinity in the films (e.g. prepared by melt press). The $\Delta H_{nm1}$ was calculated with the following equation, $$\Delta H_{nm1} = \Delta H_{m1} - \Delta H_{cc1}$$

where $\Delta H_{m1}$ is the melting endotherm mass normalized enthalpy of the first heating scan and $\Delta H_{cc1}$ is the crystallization exotherm mass normalized enthalpy of the first heating scan (as described in section 11 of ASTM D3418-12). For the films comprising nucleating agent, $\Delta H_{cc1}$ was not detected and thus $\Delta H_{nm1} = \Delta H_{m1}$.

The absolute values of the enthalpies associated with the exotherms and endotherms (i.e. $\Delta H_{m1}$, $\Delta H_{m2}$, $\Delta H_{cc1}$, and $\Delta H_{cc2}$ were used in the calculations.

Tensile Testing

The film samples were cut into 0.5 inch (~1.2 cm) wide strips. The tensile testing was conducted along the machine direction (MD) and transverse direction (TD) of the film extrusion, using an INSTRON 3365 TENSILE TESTER. The initial grip distance was at 1 inch (~2.5 cm) and the tensile speed was at 1 inch/min (~2.5 cm/min) (i.e., 100% strain/min). Test results were reported as the average of 5 sample replicates. The tensile strength (nominal), tensile elongation (percent elongation at break), and tensile modulus were determined, as described by sections 11.3 and 11.5 of ASTM D882-10.

Dynamic Mechanical Analysis (DMA)

Dynamic Mechanical Analysis (DMA) was conducted utilizing a film tension fixture available from TA Instruments as "DMA Q800" to characterize the physical properties of the films as a function of temperature. The samples were heated from −40° C. temperature to 140° C. at a rate of 2° C./minute, a frequency of 1 radian/second and a tensile strain of 0.1%.

Printing Performance Analysis

Printability was evaluated using an absolute print density test method according to ASTM D7305-08a: "Standard Test Method for Reflection Density of Printed Matter" and a GRETAG SPM 50 LT spectrodensitometer having a 5 mm aperture on the measuring head. The spectral response was calibrated using a calibration plaque and found to be accurate to within 2%. A laminate of a 25 micrometer (0.001 inch) thick acrylic pressure sensitive adhesive layer on a white colored paper release liner was nip roll laminated at room temperature to a film below such that the surfaces of the adhesive and the film were joined together to give a film article. The exposed surface of the film article was then printed with primary color bars covering at least 15 cm² using various types of printers:

VUTEK ULTRAVU II Model 150 SC printer (obtained from VUTEK, a division of EFI Corporation, Meredith, N.H.) with 3M™ Piezo Inkjet Ink Series 1500v2

SOLJET PRO4 XR-640 printer (obtained from Roland DGA Corporation, Irvine, Calif.) with Eco-Sol Max 2 ink HP LATEX 360 printer (obtained from The Hewlett-Packard Company, Palo Alto, Calif.) with HP Latex ink After printing, the samples were air dried for a minimum of 24 hours prior to measuring the print density of the color bars.

The ink color density of the Example film is compared to the ink color density of Control Example 1 by dividing the print density of the Example by the print density of the Control Example 1 and expressing the result as a percentage of standard performance. Achievements of 100% indicate equal color saturation. Values higher than 100% represent higher color saturation and values below 100% represent less saturation. Total color density is the summation of the measurements for cyan, magenta, yellow, and black.

The wt.-% of each of the components utilized in the compositions of the examples and control examples (indicated by the "C") is given in Table 1. For example Example 8 contains 70 wt.-% of PLA4032, 15 wt.-% of PVAc, 15 wt.-% of CITROFLEX A4, based on the total weight of polylactic acid polymer, polyvinyl aceate polymer, and plasticizer. Example 8 further contained 0.2 wt.-% of Ecopromote based on the total weight of the composition. The Tg and aging results of the compositions is also reported in Table 1 as follows:

TABLE 1

| Example | Components | wt % of component | $T_g$ (° C.) | Aging at 80° C. for 24 hrs |
|---|---|---|---|---|
| C1 | PLA4032/ADMEX6995 | 89/11 | 46 | Pass |
| C2 | PLA4032/ADMEX6995 | 85/14 | 39 | Fail |
| C3 | PLA4032/ADMEX6995 | 82/18 | 37 | Fail |
| C4 | PLA4032/ CITROFLEXA4/ ECOPROMOTE | 90/10/0.2 | 32 | Pass |
| C5 | PLA4032/ CITROFLEXA4/ ECOPROMOTE | 86/14/0.2 | 25 | Pass |
| C6 | PLA4032/ CITROFLEXA4/ ECOPROMOTE | 85/15/0.2 | 21 | Fail |
| C7 | PLA4032/ CITROFLEXA4/ ECOPROMOTE | 83/17/0.2 | 15 | Fail |
| 8 | PLA4032/ VINNAPSUW4/ CITROFLEXA4/ ECOPROMOTE | 70/15/15/0.2 | 15 | Pass |
| 9 | PLA4032/ VINNAPASUW4/ CITROFLEXA4/ ECOPROMOTE | 67/16/16/1 | 10 | Pass |
| 10 | PLA4032/ VINNAPASUW4/ CITROFLEXA4/ ECOPROMOTE | 65/20/15/0.2 | 17 | Pass |
| 11 | PLA4032/ VINNAPASUW4/ CITROFLEXA4/ ECOPROMOTE | 60/25/15/0.2 | 11 | Pass |
| 12 | PLA4032/ VINNAPASUW4/ CITROFLEXA4/ ECOPROMOTE | 50/35/15/0.1 | 5 | Pass |
| 13 | PLA4032/ VINNAPASUW4/ TEGMER809/ ECOPROMOTE | 60/28/12/0.2 | 13 | Pass |
| 14 | PLA4032/ VINNAPASUW4/ TEGMER809/ ECOPROMOTE | 53/35/12/0.2 | 9 | Pass |

As illustrated by Table 1, Comparative Examples C1, C4 and C5 passed the aging test, yet Comparative Examples C2, C3, C6 and C7 failed the aging test. The Tg of the sample can be lowered to 25° C. (as illustrated by Comparative C5), but not below 25° C. yet still pass the aging test (as illustrated by Comparative Examples C6 and C7). When the composition included PLA, plasticizer and PVAc, the Tg can be reduced below 25° C. and pass the aging test.

The wt.-% of each of the components utilized in the compositions of the examples and control examples (indicated by the "C"), the DSC results are depicted in Table 2 as follows:

TABLE 2

| Ex. | Components (wt.-% of components) | $T_c$ (° C.) | $T_{m2}$ (° C.) | $T_g$ (° C.) | $\Delta H_{nm2}$ (J/g) |
|---|---|---|---|---|---|
| C15 | PLA/ECOPROMOTE (100/0.2) | 125 | 167 | 63 | 42.9 |
| C4 | PLA4032/CITROFLEXA4/ ECOPROMOTE (90/10/0.2) | 122 | 162 | 36 | 41.4 |
| C5 | PLA4032/CITROFLEXA4/ ECOPROMOTE (86/14/0.2) | 120 | 160 | 25 | 40.1 |
| 8 | PLA4032/VINNAPASUW4/ CITROFLEXA4/ ECOPROMOTE (70/15/15/0.2) | 117 | 165 | 14 | 33.5 |
| 9 | PLA4032/VINNAPASUW4/ CITROFLEXA4/ ECOPROMOTE (67/16/16/1) | 119 | 163 | 10 | 32.5 |
| 10 | PLA4032/VINNAPASUW4/ CITROFLEXA4/ ECOPROMOTE (65/20/15/0.2) | 117 | 165 | 17 | 31.3 |
| 11 | PLA4032/VINNAPASUW4/ CITROFLEXA4/ ECOPROMOTE (60/25/15/0.2) | 115 | 164 | 13 | 29.4 |
| 12 | PLA4032/VINNAPASUW4/ CITROFLEXA4/ ECOPROMOTE (50/35/15/0.1) | 112 | 160 | 5 | 23.8 |
| 13 | PLA4032/VINNAPASUW4/ TEGMER809/ ECOPROMOTE (60/28/12/0.2) | 120 | 165 | 13 | 28.4 |
| 14 | PLA4032/VINNAPASUW4/ TEGMER809/ ECOPROMOTE (53/35/12/0.2) | 118 | 164 | 9 | 26.2 |
| 16 | PLA4032/VINNAPASUW4/ CITROFLEXA4 (50/35/15) as melt pressed | — | 160 | 27 | 1.5 |

TABLE 2-continued

| Ex. | Components (wt.-% of components) | $T_c$ (° C.) | $T_{m2}$ (° C.) | $T_g$ (° C.) | $\Delta H_{nm2}$ (J/g) |
|---|---|---|---|---|---|
| 17 | PLA4032/VINNAPASUW4/CITROFLEXA4/ECOPROMOTE (44.8/35/20/0.2) | 112 | 160 | 2 | 23.0 |
| 18 | PLA4032/VINNAPASUW4/CITROFLEXA4/ECOPROMOTE (39.8/35/25/0.2) | 109 | 158 | −8 | 20.9 |
| 19 | PLA4032/PLA4060/VINNAPASUW4/CITROFLEXA4/ECOPROMOTE (20/34/35/10/1) | 107 | 161 | 27 | 13.2 |
| 20 | PLA4032/PLA4060/VINNAPASUW4/CITROFLEXA4/ECOPROMOTE (15/50/20/14/1) | 104 | 161 | 28 | 10.5 |
| 21 | PLA4032/PLA4060/VINNAPASUW4/TEGMER804/ECOPROMOTE (20/34/35/10/1) | 112 | 162 | 22 | 14.5 |

Figure 9:
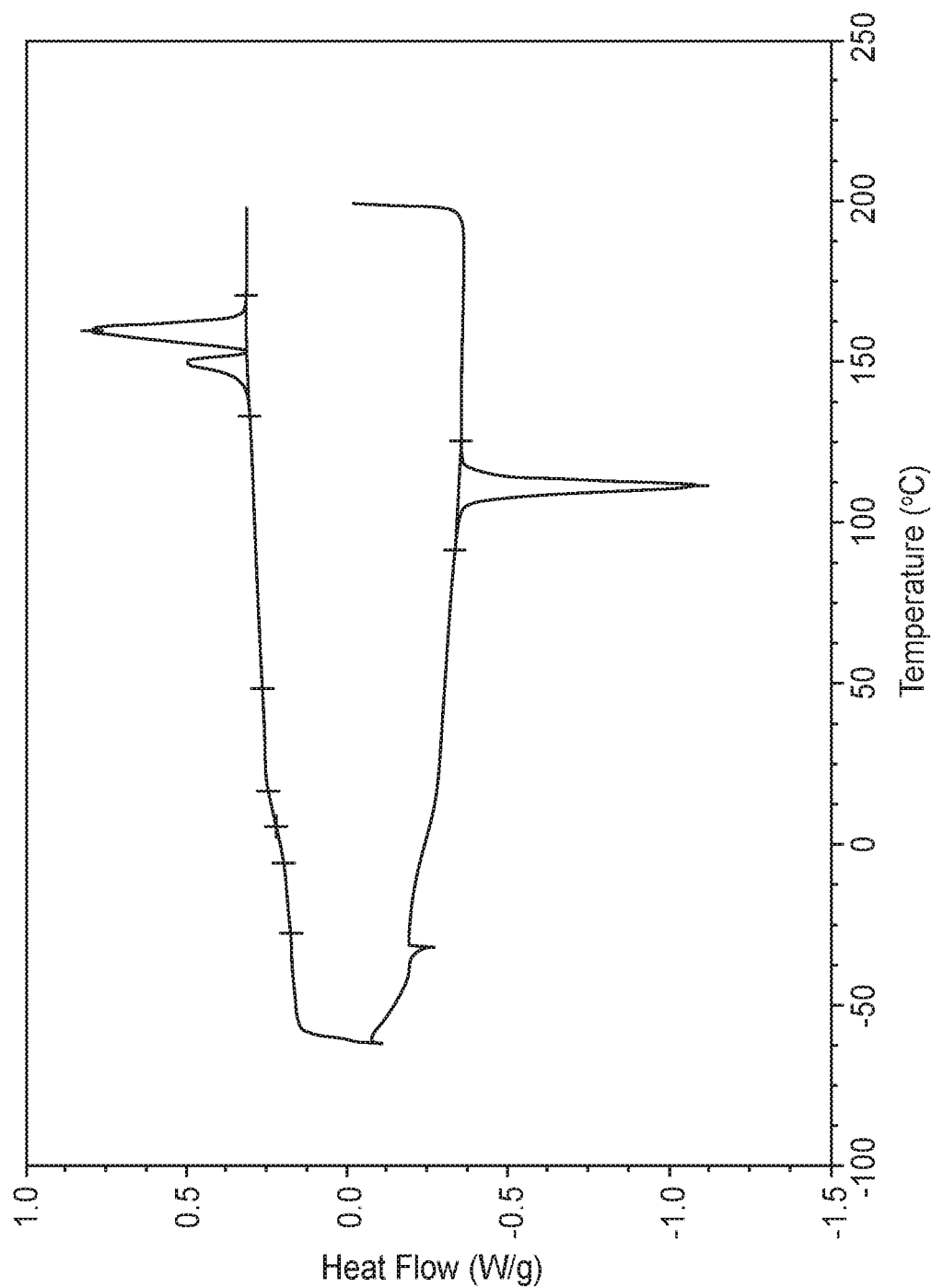
FIG. 9 is a representative DSC profile of a composition comprising a nucleating agent exhibiting a sharp crystallization peak exotherm during cooling.
Figure 10:
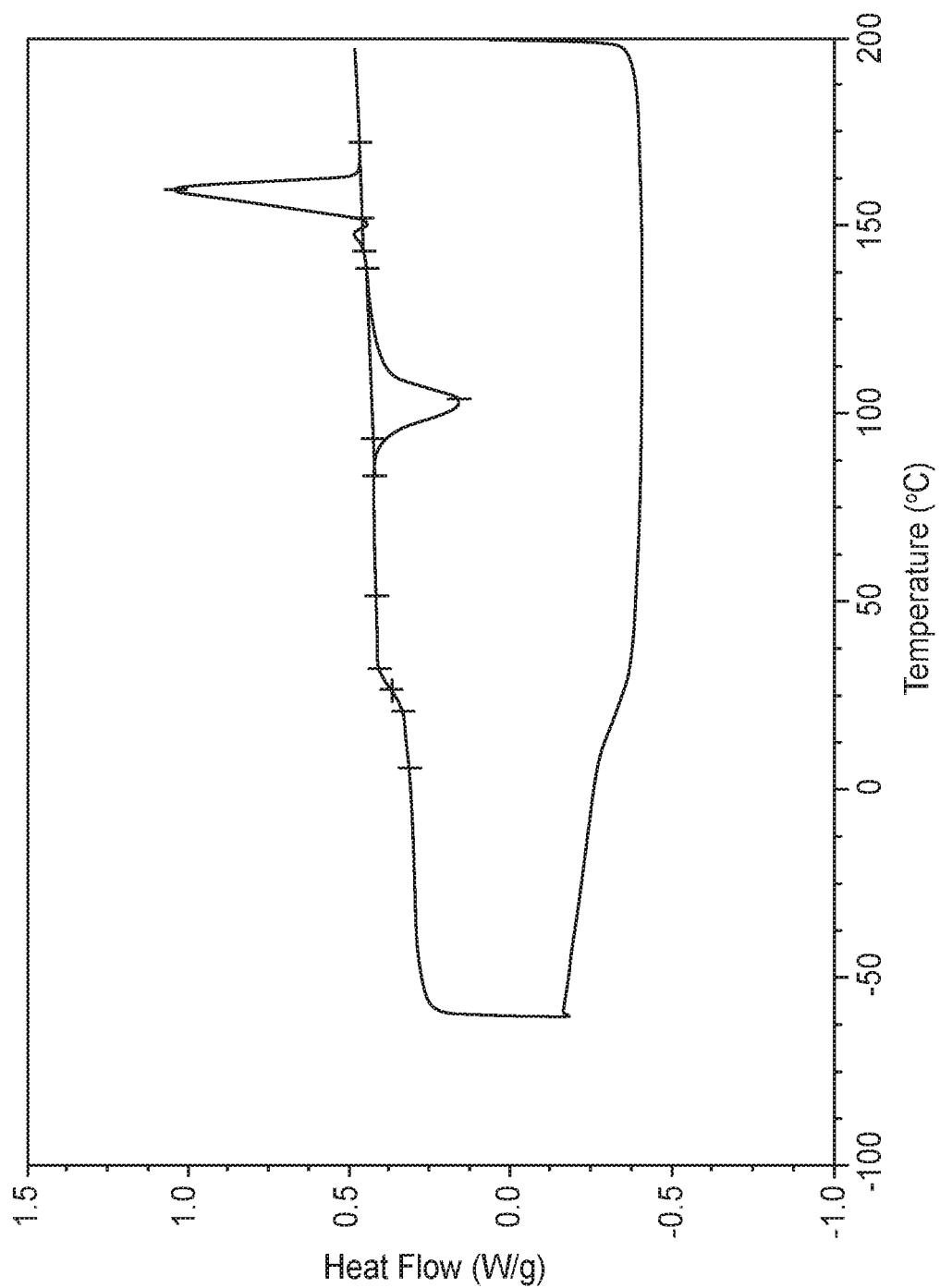
FIG. 10 is a representative DSC profile of a composition without a nucleating agent that did not exhibit a crystallization peak exotherm during cooling.

A representative DSC profile of the composition of Example 12 is depicted in FIG. 9. This DSC profile exhibits a sharp crystallization peak exotherm during cooling. The composition of Example 16 didn't exhibit any crystallization during cooling, as depicted in FIG. 10.

The wt.-% of each of the components utilized in the compositions to prepare the melt-pressed film examples and control examples (indicated by the "C"), the DSC and tensile testing results of these films are depicted in Table 3 as follows:

TABLE 3

| Ex. | Components (wt.-% of components) | $T_{m1}$ (° C.) | $\Delta H_{nm1}$ (J/g) | Tensile Strength (MPa) | Tensile Elongation | Tensile Modulus (MPa) |
|---|---|---|---|---|---|---|
| | Plasticized PVC (CONTROLTAC ™ IJ 180-10) Tg = 15° C. | — | N/A | 24 | 200% | 500 |
| | VINNAPASUW4 (PVAc) Tg = 43° C. | — | N/A | 34 | 7% | 3000 |
| | PLA4032 Tg = 63° C. | 167 | N/A | 60 | 6% | 3500 |
| C4 | PLA4032/CITROFLEXA4/ECOPROMOTE (90/10/0.2) | 168 | 49.6 | 30.3 | 23% | 890 |
| C5 | PLA4032/CITROFLEXA4/ECOPROMOTE (86/14/0.2) | 165 | 36.5 | 24.9 | 28% | 650 |
| 8 | PLA4032/VINNAPASUW4/CITROFLEXA4/ECOPROMOTE (70/15/15/0.2) | 164 | 34.2 | 21.6 | 86% | 390 |
| 10 | PLA4032/VINNAPASUW4/CITROFLEXA4/ECOPROMOTE (65/20/15/0.2) | 162 | 29.7 | 27.3 | 349% | 371 |
| 11 | PLA4032/VINNAPASUW4/CITROFLEXA4/ECOPROMOTE (60/25/15/0.2) | 162 | 30.1 | 20.6 | 363% | 263 |
| 12 | PLA4032/VINNAPASUW4/CITROFLEXA4/ECOPROMOTE (50/35/15/0.1) | 162 | 27.0 | 17.9 | 369% | 203 |
| 13 | PLA4032/VINNAPASUW4/TEGMER809/ECOPROMOTE (60/28/12/0.2) | 164 | 31.4 | 21.9 | 320% | 328 |
| 14 | PLA4032/VINNAPASUW4/TEGMER809/ECOPROMOTE (53/35/12/0.2) | 163 | 27.5 | 18.9 | 373% | 253 |
| 16 | PLA4032/VINNAPASUW4/CITROFLEXA4 (50/35/15) AS MELT PRESSED | 160 | 1.7 | 30.1 | 472% | 241 |
| 17 | PLA4032/VINNAPASUW4/CITROFLEXA4/ECOPROMOTE (44.8/35/20/0.2) | 158 | 23.4 | 14.5 | 450% | 153 |
| 18 | PLA4032/VINNAPASUW4/CITROFLEXA4/ECOPROMOTE (39.8/35/25/0.2) | 157 | 21.6 | 8.7 | 390% | 101 |
| 19 | PLA4032/PLA4060/VINNAPASUW4/CITROFLEXA4/ECOPROMOTE (20/34/35/10/1) | 161 | 14.1 | 26.3 | 302% | 613 |
| 20 | PLA4032/PLA4060/VINNAPASUW4/CITROFLEXA4/ECOPROMOTE (15/50/20/14/1) | 159 | 12.1 | 27.9 | 364% | 485 |

TABLE 3-continued

| Ex. | Components (wt.-% of components) | $T_{m1}$ (° C.) | $\Delta H_{nm1}$ (J/g) | Tensile Strength (MPa) | Tensile Elongation | Tensile Modulus (MPa) |
|---|---|---|---|---|---|---|
| 21 | PLA4032/PLA4060/ VINNAPASUW4/TEGMER804/ ECOPROMOTE (20/34/35/10/1) | 161 | 14.2 | 25.4 | 380% | 416 |

The Tgs of the films of Table 3 were also measured by DSC and would to be the same as the compositions of Table 2. Examples 12 and 16 were tested according to the previously described Dynamic Mechanical Analysis. The results of Example 12 are depicted in FIG. 11 and the results of Example 16 are depicted in FIG. 12.

The previously described PLA-based films can be utilized in various graphic articles as a backing, intermediate layer, or cover film. A graphic may be provided on the PLA-based film, especially by printing with a radiation curable ink.

Example 22

A twin screw extruder (Zone 1: 250° F. or 121° C.; Zones 2 and 3: 390° F. or 199° C.; Zones 4 and 5: 350° F. or 177° C.) and underwater pelletizer were used to prepare pre-compounded and free-flowing PLA pellets, which had the following composition:

| Components | Composition (wt.-%) |
|---|---|
| INGEO 4032 PLA | 12.2 |
| INGEO 4060 PLA | 42.2 |
| VINNAPAS UW25 PVAc | 22 |
| CITROFLEX A4 Plasticizer | 12 |
| ECOPROMOTE Nucleating Agent | 0.3 |
| White Pigment $TiO_2$ | 11.3 |

The pre-compounded PLA pellets were fed to a single screw extruder (the Gloucester Engineering extruder, Gloucester, Mass.) having a 2 inch (~5.1 cm) diameter screw and a length of 78 inch (198 cm). The extruder was operated at a speed of 14 rpm, with a cooled feed throat, and the following approximate zone and die temperatures: Z1: 166° C. (330° F.); Z2: 168° C. (335° F.); Z3: 171° C. (340° F.); Z4: 174° C. (345° F.); and die: 177° C. (350° F.). Film was extruded through a 0.004 inch (0.102 mm) die gap onto a 30 inch (76.2 cm) wide polyester carrier film to provide a film product having a thickness of about 0.002 inch (0.051 mm) and a width of about 30 inch (76.2 cm). The film was thermally annealed offline in an oven at 60° C. (140° F.) for about 3 hours to achieve crystallization. The polyester carrier was removed from the film products prior to testing.

TABLE 4

Physical Properties of Example 22 Extruded Film

| Ex. | Components (wt.-% of components) | $T_g$ (° C.) | $T_{m1}$ (° C.) | $\Delta H_{nm1}$ (J/g) | Tensile Strength (MPa) | Tensile Elongation | Tensile Modulus (MPa) |
|---|---|---|---|---|---|---|---|
| 22 | PLA4032/PLA4060/ VINNAPASUW25/ CITROFLEXA4 ECOPROMOTE/TIO$_2$ (12.2/42.2/22/12/0.3/11.3) | 15 | 158 | 11.6 | 27.2 (MD) 27.4 (TD) | 229% (MD) 270% (TD) | 422 (MD) 421 (TD) |

In Table 4, MD=machine direction; TD=transverse direction.

Representative film examples were printed with various inks and the print density evaluated as previously described. The test results are set forth in the following tables:

TABLE 5

Print Density by VUTEK 150 Printer with 3M ™ Piezo Inkjet Ink Series 1500v2

| Ex. | Components (wt.-% of components) | Cyan | Magenta | Yellow | Black | Total | Total % of Cast Vinyl |
|---|---|---|---|---|---|---|---|
| Control 1 | Cast vinyl (SCOTCHCAL IJ 170-10) | 2.22 | 2.08 | 1.26 | 2.31 | 7.87 | 100% |
| Control 2 | Calendered vinyl (CONTROLTAC 40C-10R) | 2.06 | 2.06 | 1.26 | 2.46 | 7.84 | 100% |
| 19 | PLA4032/PLA4060/ VINNAPASUW4/CITROFLEXA4/ ECOPROMOTE (20/34/35/10/1) | 2.11 | 1.94 | 1.28 | 2.17 | 7.5 | 95% |

TABLE 5-continued

Print Density by VUTEK 150 Printer with 3M™ Piezo Inkjet Ink Series 1500v2

| Ex. | Components (wt.-% of components) | Cyan | Magenta | Yellow | Black | Total | Total % of Cast Vinyl |
|---|---|---|---|---|---|---|---|
| 20 | PLA4032/PLA4060/ VINNAPASUW4/ CITROFLEXA4/ ECOPROMOTE (15/50/20/14/1) | 1.48 | 1.86 | 1.3 | 1.95 | 6.59 | 84% |
| 21 | PLA4032/PLA4060/ VINNAPASUW4/ TEGMER804/ ECOPROMOTE (20/34/35/10/1) | 1.59 | 1.86 | 1.27 | 1.9 | 6.62 | 84% |
| 22 | PLA4032/PLA4060/ VINNAPASUW25/ CITROFLEXA4/ ECOPROMOTE/TiO$_2$ (12.2/42.2/22/12/0.3/11.3) | 2.25 | 2.09 | 1.25 | 2.44 | 8.03 | 102% |

TABLE 6

Print Density by ROLAND SOLJET Printer with Eco-Sol Max 2 ink

| Ex. | Components (wt.-% of components) | Cyan | Magenta | Yellow | Black | Total | Total % of Cast Vinyl |
|---|---|---|---|---|---|---|---|
| Control 1 | Cast vinyl (SCOTCHCAL IJ 170-10) | 2.1 | 1.38 | 1.01 | 2.04 | 6.53 | 100% |
| Control 2 | Calendered vinyl (CONTROLTAC 40C-10R) | 2.22 | 1.41 | 1.04 | 2.14 | 6.81 | 104% |
| 22 | PLA4032/PLA4060/ VINNAPASUW25/ CITROFLEXA4/ ECOPROMOTE/TiO$_2$ (12.2/42.2/22/12/0.3/11.3) | 2.01 | 1.38 | 1.0 | 2.08 | 6.47 | 99% |

TABLE 7

Print Density by HP Latex 360 Printer with HP Latex Ink

| Ex. | Components (wt.-% of components) | Cyan | Magenta | Yellow | Black | Total | Total % of Cast Vinyl |
|---|---|---|---|---|---|---|---|
| Control 1 | Cast vinyl (SCOTCHCAL IJ 170-10) | 1.68 | 1.52 | 1.06 | 1.94 | 6.2 | 100% |
| Control 2 | Calendered vinyl (CONTROLTAC 40C-10R) | 1.64 | 1.49 | 1.06 | 1.93 | 6.12 | 99% |
| 22 | PLA4032/PLA4060/ VINNAPASUW25/ CITROFLEXA4/ ECOPROMOTE/TiO$_2$ (12.2/42.2/22/12/0.3/11.3) | 1.67 | 1.51 | 1.05 | 1.95 | 6.18 | 100% |

What is claimed:

1. An article comprising
a first film layer comprising a composition, the composition comprising semicrystalline polylactic acid polymer, polyvinyl acetate polymer, and plasticizer;
wherein the polyvinyl acetate polymer has a Tg of at least 25° C., a weight average molecular weight ranging from 75,000 g/mol to 750,000 g/mol; and is present in an amount ranging from 10 to 50 wt. %, based on the total amount of polylactic acid polymer(s), polyvinyl acetate polymer and plasticizer;
wherein the plasticizer is present in an amount ranging from 5 to 35 wt. %, based on the total amount of polylactic acid polymer(s), polyvinyl acetate polymer and plasticizer;
wherein the first film layer has a tensile strength ranging from 10 to 40 MPa, a tensile elongation from 50% to 600% and does not exhibit plasticizer migration when aged at 80° C. for 24 hours; and
the article is a graphic film having a graphic comprising a dried and/or cured ink layer printed on a major surface of the first film layer.

2. The article of claim 1 wherein the ink layer comprises a colorant.

3. The article of claim 1 wherein the ink layer comprises a polymeric binder selected from the group consisting of vinyl-containing polymers, acrylic-containing polymers, urethane-containing polymer, and mixtures thereof.

4. The article of claim 1 wherein the ink layer is a dried and/or cured radiation cured ink, organic solvent-based ink, or water-based ink.

5. The article of claim 4 wherein the dried and/or cured ink is an ink-jetted ink or a screen printed ink.

6. The article of claim 1 further comprises a topcoat layer or cover film disposed on the graphic film.

7. The article of claim 6 wherein the cover film is bonded to the graphic film with an adhesive layer.

8. The article of claim 6 wherein the cover film comprises a semicrystalline polylactic acid polymer.

9. The article of claim 1 wherein the first film layer further comprises an amorphous polylactic acid polymer.

10. The article of claim 9 wherein the film has a Tg of less than 30° C.

11. The article of claim 1 wherein the polyvinyl acetate polymer has a glass transition temperature no greater than 50° C.

12. The article of claim 1 further comprising a nucleating agent in an amount ranging from about 0.01 wt. % to about 1 wt. %.

13. The article of claim 1 wherein the article further comprises a backing disposed on the opposing surface as the film layer.

14. The article of claim 1 wherein the article further comprises a pressure sensitive adhesive disposed on the opposing surface of the film layer or backing.

15. The article of claim 1 wherein the film comprises less than 5 wt. % of organic biomaterial fillers including flour and starch.

16. The article of claim 1 wherein the film further comprises inorganic oxide material.

17. The article of claim 1 wherein the first film layer is a cover film.

18. The article of claim 1 wherein the first film layer has a tensile elongation from 100% to 600%.

19. The article of claim 1 wherein the plasticizer is selected from the group consisting of citrate-based plasticizer, plasticizer comprising a polyethylene glycol backbone and ester alkyl terminal groups, polymeric adipate, aliphatic polyester, and mixtures thereof.

20. The article of claim 1 wherein the polyvinyl acetate polymer has a glass transition temperature no greater than 45° C.

21. The article of claim 1 wherein the composition has a Tg less than 25° C.

22. The article of claim 1 wherein the composition has a net melting endotherm for the first heating scan, $\Delta H_{nm1}$, greater than 10 and less than 40 J/g.

23. The article of claim 1 wherein the first film layer has a tensile modulus from 50 MPa to 750 MPa.

24. The article of claim 1 wherein the first film layer has a tensile storage modulus as determine by dynamic mechanical analysis of at least 10 MPa for a temperature range from −40° C. to 125° C. when heated at a rate of 2 C°/min.

25. The article of claim 1 wherein the first film layer has a tensile storage modulus as determine by dynamic mechanical analysis of at least 5 MPa for a temperature range from 25° C. to 80° C. when heated at a rate of 2 C°/min.

* * * * *